United States Patent [19]
Hiroshige

[11] Patent Number: 5,790,649
[45] Date of Patent: Aug. 4, 1998

[54] CALL TRANSFER SYSTEM AND ELECTRONIC MAIL TRANSFER SYSTEM

[75] Inventor: Norimichi Hiroshige, Kanagawa, Japan

[73] Assignee: Fujitsu Limited, Kanagawa, Japan

[21] Appl. No.: 874,207

[22] Filed: Jun. 13, 1997

Related U.S. Application Data

[62] Division of Ser. No. 541,038, Oct. 11, 1995.

[30] Foreign Application Priority Data

Mar. 16, 1995 [JP] Japan .................. HEI-7-57466

[51] Int. Cl.$^6$ ........................................ H04M 1/64
[52] U.S. Cl. ............... 379/201; 395/200.36; 379/93.24
[58] Field of Search ............... 340/825.44, 825.49; 395/200.36; 379/93.01, 93.24, 201, 211; 455/412

[56] References Cited

U.S. PATENT DOCUMENTS

| | | | |
|---|---|---|---|
| 5,127,276 | 7/1992 | Doll, Jr. et al. | 379/67 |
| 5,138,655 | 8/1992 | Takashima et al. | 379/201 |
| 5,243,645 | 9/1993 | Bissell et al. | 379/211 |
| 5,329,578 | 7/1994 | Brennan et al. | 379/67 |
| 5,351,276 | 9/1994 | Doll, Jr. et al. | 379/67 |
| 5,369,695 | 11/1994 | Chakravarti et al. | 379/212 |
| 5,394,464 | 2/1995 | Hanson et al. | 379/201 |
| 5,414,759 | 5/1995 | Ishikuri et al. | 379/88 |
| 5,436,963 | 7/1995 | Fitzpatrick et al. | 379/212 |
| 5,488,657 | 1/1996 | Lynn et al. | 379/395 |
| 5,509,000 | 4/1996 | Oberlander | 379/211 |
| 5,541,983 | 7/1996 | Rose | 379/201 |
| 5,550,907 | 8/1996 | Carlsen | 379/207 |

*Primary Examiner*—Daniel S. Hunter
*Attorney, Agent, or Firm*—Helfgott & Karas, P.C.

[57] ABSTRACT

An electronic mail transfer system including an information processing station and a telephone exchange system. The information processing system accommodates a plurality of terminals and has an electronic mail transmitting function. The telephone exchanging system accommodates a plurality of telephones interrelated to the respective terminals and each having an input element. The telephone exchanging system operates to monitor an input operation performed by the input elements of each telephone, and transmits information indicative of the input operation to the information processing system. The information processing system operates to control an electronic mail transfer operation based on the information indicative of the input operation transmitted from the telephone exchanging system, to transfer electronic mail destined for a terminal to a predetermined transfer destination if no input operation is performed at a telephone corresponding to the terminal and to not transfer the electronic mail if an input operation is performed at the telephone.

4 Claims, 20 Drawing Sheets

A-11:transfer management data for absent subscriber

ON/OFF : On/Off of electronic mail transfer function

Address : Address of electronic mail transfer destination

Fig. 8(a)

Terminal/ Telephone
status management data
B-11

| | |
|---|---|
| ID NO. | B-11-1 |
| STATUS | B-11-2 |
| DATE/TIME | B-11-3 |
| ELAPSED TIME | B-11-4 |
| LAST REFERENCE RECORD | B-11-5 |

Fig. 8(b)

Response delay
transfer condition data
B-12

| | |
|---|---|
| ID NO. | B-12-1 |
| RECORD NO. | B-12-2 |
| TIME 1 | B-12-3 |
| TIME 2 | B-12-4 |
| PRESET TIME | B-12-5 |
| TRANSFER DESTINATION NO. | B-12-6 |

Fig. 8(c)

First electronic mail
transfer destination data
B-13

| | |
|---|---|
| ID NO. | B-13-1 |
| TRANSFER REASON | B-13-2 |
| ADDRESS OF E-MAIL TRANSFER DESTINATION | B-13-3 |

Fig. 8(d)

Second electronic mail
transfer destination data
B-14

| | |
|---|---|
| ID NO. | B-14-1 |
| TRANSFER DESTINATION NO. | B-14-2 |
| ADDRESS OF E-MAIL TRANSFER DESTINATION | B-14-3 |

Subscriber present status management data C-11

Response delay transfer time specification data C-12

Response delay transfer destination data C-13

Fig. 10

| | | |
|---|---|---|
| ID NO. | DTE1 | B-12-1 |
| RECORD NO. | 00 | B-12-2 |
| TIME 1 | 0 (minute) | B-12-3 |
| TIME 2 | 0 (minute) | B-12-4 |
| PRESENT TIME | 60 (seconds) | B-12-5 |
| TRANSFER DESTINATION NO. | VOICE MAIL | B-12-6 |
| RECORD NO. | 01 | B-12-2 |
| TIME 1 | 0 (minute) | B-12-3 |
| TIME 2 | 10 (minutes) | B-12-4 |
| PRESENT TIME | 30 (seconds) | B-12-5 |
| TRANSFER DESTINATION NO. | SECRETARY | B-12-6 |
| RECORD NO. | 02 | B-12-2 |
| TIME 1 | 10 (minutes) | B-12-3 |
| TIME 2 | 30 (minutes) | B-12-4 |
| PRESENT TIME | 10 (seconds) | B-12-5 |
| TRANSFER DESTINATION NO. | HANDY PHONE | B-12-6 |
| RECORD NO. | 03 | B-12-2 |
| TIME 1 | 30 (minutes) | B-12-3 |
| TIME 2 | 999 (minutes) | B-12-4 |
| PRESENT TIME | 5 (seconds) | B-12-5 |
| TRANSFER DESTINATION NO. | VOICE MAIL | B-12-6 |

Fig. 12

| MSG |
| --- |
| Sender |
| SUBSCRIBER (ADDRESS) |
| Status |
| MAIL TRANSFER |
| MAIL TRANSFER DESTINATION |
| DATA/TIME |
|  |

1) M S G : Message type=subscribe presence/absence management message

2) SENDER : Message originator
$$= \begin{cases} \text{terminal} \\ \text{Telephony Server} \end{cases}$$

3) SUBSCRIBER : Identification of terminal subscriber(Address on network)

4) Status : Subscriber present/absent status
$$= \begin{cases} \text{Subscriber present status} \\ \text{Subscriber absent status} \\ \text{Subscriber possibly absent status} \end{cases}$$

5) MAIL TRANSFER : On/Off of electronic mail transfer function

6) MAIL TRANSFER DESTINATION :
Address of electronic mail transfer destination

7) DATA/TIME : Date and time when last input operation performed by input device of terminal is detected.

Fig. 13

| MSG |
|---|
| SENDER |
| SUBSCRIBER(DN) |
| STATUS |
| TIMING |
| RESPONSE DELAY TRANSFER DESTINATION |
| ABSENCE REASON |
| |

1) M S G : Message type
= Subscriber presence/absence management message

2) SENDER : Message originator
$= \begin{cases} \text{Electronic exchange} \\ \text{Telephony Server} \end{cases}$ 3) SUBSCRIBER(DN) : Extension number of telephone 4) STATUS : Subscriber present/absent status
$= \begin{cases} \text{Subscriber present status} \\ \text{Subscriber possibly absent status} \\ \text{Subscriber absent status} \end{cases}$ 5) TIMING : Response delay transfer timing 6) RESPONSE DELAY TRANSFER DESTINATION: Dial number of response delay transfer destination (extension number or external phone number)

7) ABSENCE REASON: Subscriber absence reason for subscriber absence registration at telephone

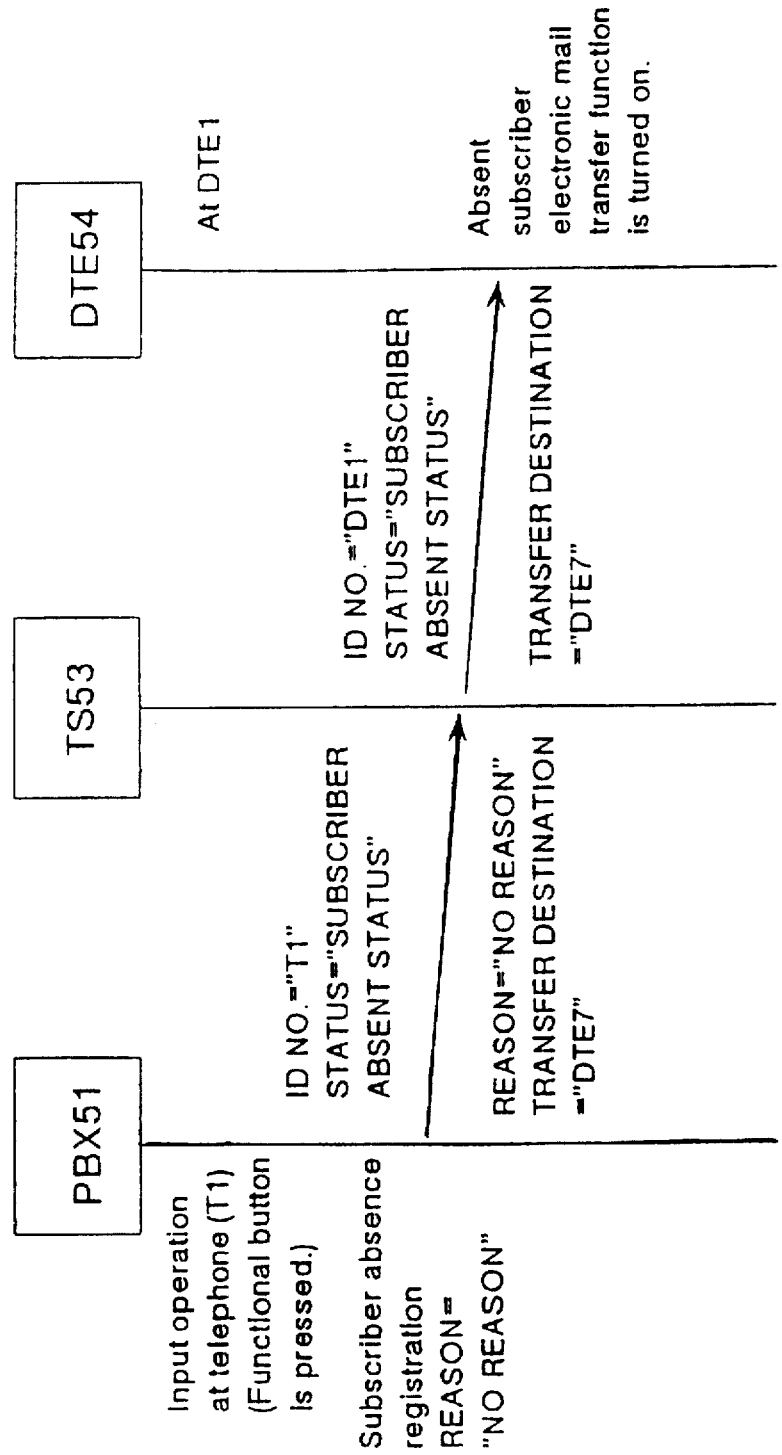

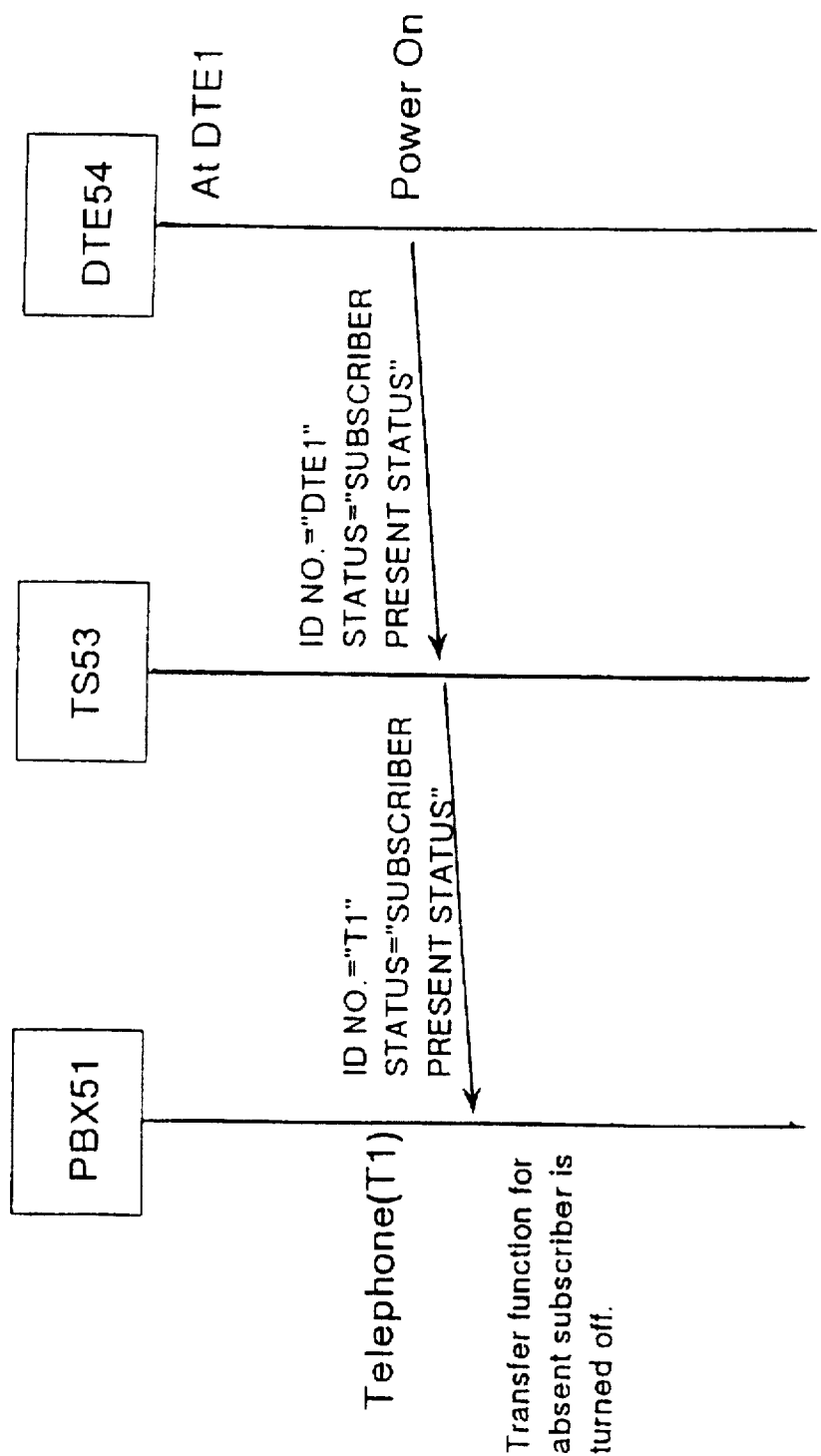

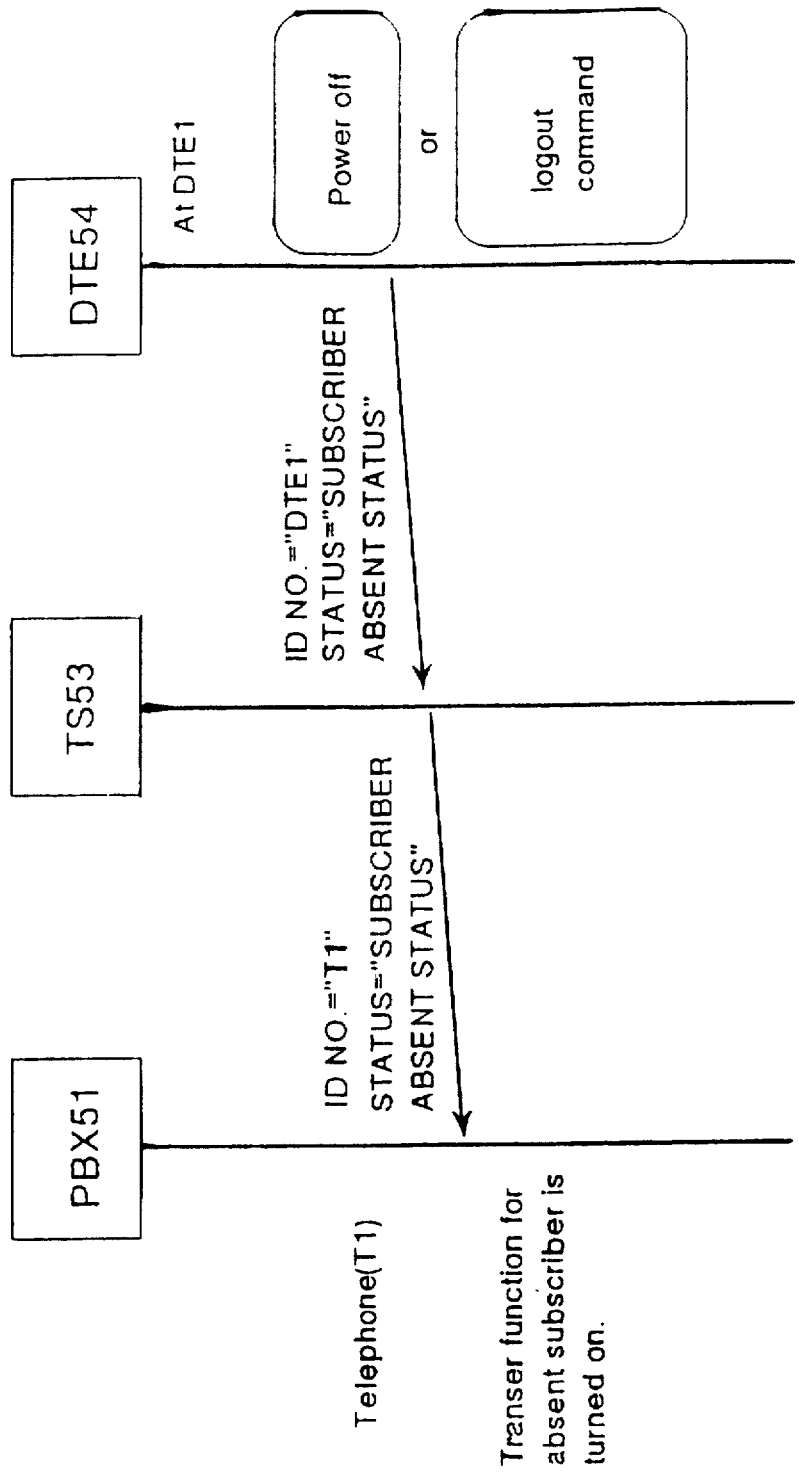

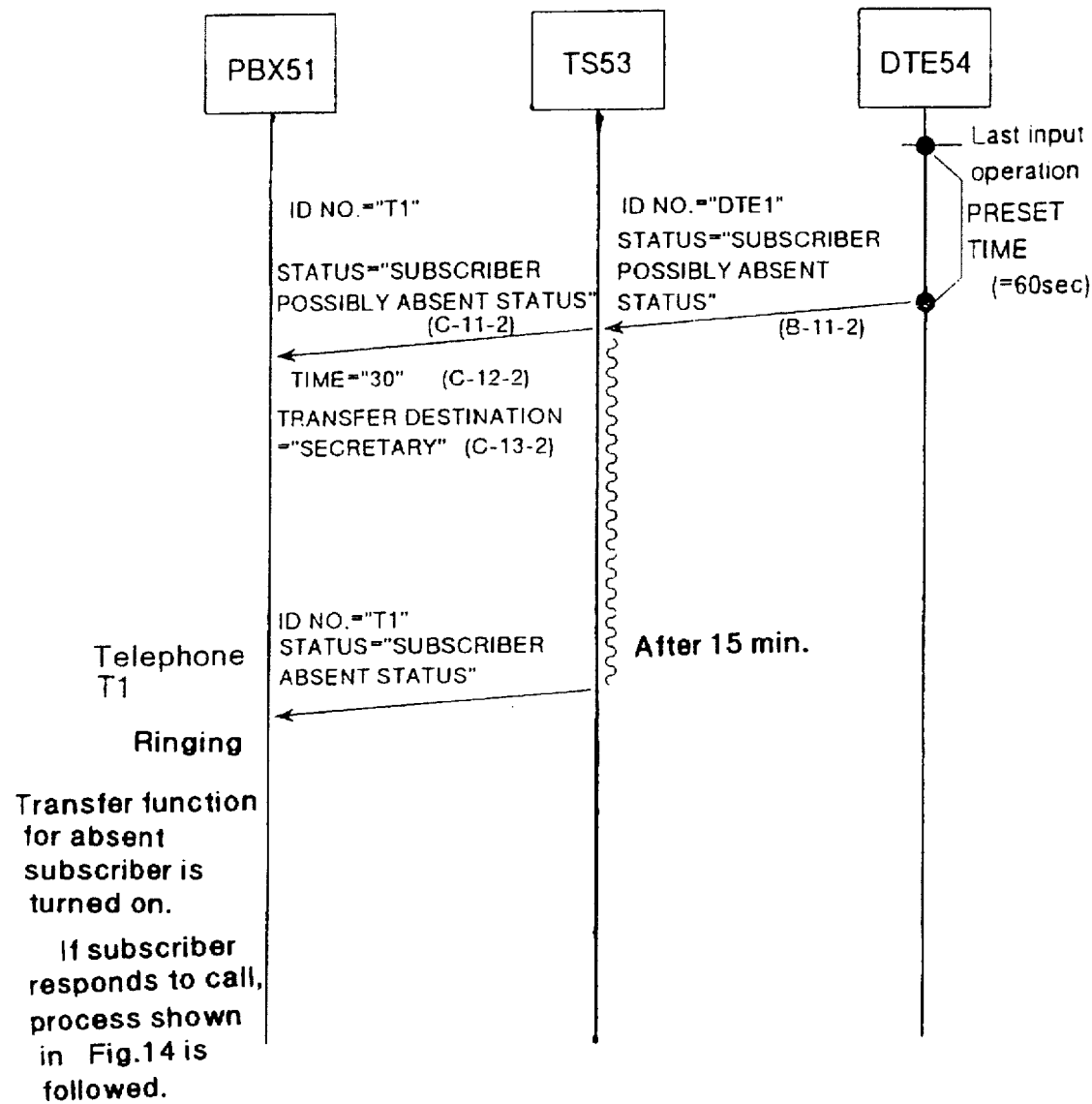

CALL TRANSFER SYSTEM AND ELECTRONIC MAIL TRANSFER SYSTEM

This is division of application Ser. No. 08/541,038, filed Oct. 11, 1995.

BACKGROUND OF THE INVENTION

1. Field of the Invention

The present invention relates to call transfer systems and electronic mail transfer systems. More particularly, the invention relates to call transfer systems and electronic mail transfer systems which realize an advanced subscriber presence/absence management function by organically linking a telephone exchanging system such as an electronic exchange having a subscriber presence/absence management function and an absent subscriber call transfer function to an information processing system such as a network server having an electronic mail transmission function.

2. Description of Related Art

Some of conventional telephone exchanging systems have a subscriber presence/absence management function and an absent subscriber call transfer function. Such telephone exchanging systems generally comprise a plurality of telephones and an electronic exchange accommodating these telephones. The subscriber presence/absence management function allows for registration of information on the subscriber present/absent status of a telephone A accommodated in the electronic exchange. The absent subscriber call transfer function allows a call received by the telephone A to be transferred to a predetermined telephone B when a subscriber absent status is registered at the telephone A. In this case, the electronic exchanging system serves to store therein the registration information and control the call transfer.

The subscriber present/absent status of the telephone A is manually registered by the subscriber at the telephone A. When the subscriber is to step out, for example, the subscriber registers a subscriber absent status by inputting a phone number of a transfer destination by way of ten keys of the telephone A and pressing an operation button for inputting the subscriber absent status. The registration information of the subscriber absent status is stored in a memory of the electronic exchange.

Further, the subscriber has to perform an intentional input operation in accordance with a predetermined procedure if he registers a phone number of a call transfer destination or changes a response delay time when he steps out. The response delay time herein means how long the electronic exchange is to wait to allow the telephone A to perform a call transfer operation when the subscriber does not respond to a call to the telephone A (or the telephone A does not become in an off-hook state).

Among other various information processing systems, systems connected to a plurality of various computer terminals in a wide area network (WAN) and a local area network (LAN) have an electronic mail transmission function which allows one terminal subscriber m to directly transmit a document or letter to another terminal subscriber n.

Some of the systems further have an absent subscriber electronic mail transfer function which allows an electronic mail destined for the terminal subscriber n to be transferred to a predetermined transfer destination in case that the subscriber n has made a subscriber absence registration.

In such a networked information processing system, a subscriber has to register the subscriber present/absent status and an electronic mail transfer destination at the terminal of the subscriber to realize the subscriber presence/absence management function and the absent subscriber electronic mail transfer function.

Since a telephone exchanging system having an electronic exchange as a core system is independent of an information processing system, the registration of the subscriber present/absent status and transfer destination should be made both at the telephone exchanging system and at the information processing system.

As described above, it is very troublesome for a subscriber to perform registration operations both at the electronic exchange and at the information processing system to utilize the subscriber presence/absence management function every time he steps out or returns to his seat. Such a troublesome registration operation may cause the subscriber to forget to perform the registration operation. If the subscriber forgets to make a subscriber presence registration when he returns to his seat, for example, the subscriber absent status that he registered when he stepped out is still in effect, so that a call or electronic mail is transferred to a transfer destination he registered.

The registration operation for the subscriber present/absent status and transfer destination has to be performed both at the telephone exchanging system and at the information processing system as described above. In addition, where the registration procedure in the telephone exchanging system is extremely different from that in the information processing system, an erroneous operation tends to occur such that a registration is not properly made as intended by the subscriber.

With such a troublesome procedure and repeated erroneous operations for the registration, the useful subscriber presence/absence management and electronic mail transfer functions cannot be effectively utilized.

SUMMARY OF THE INVENTION

In view of the foregoing, it is an object of the present invention to facilitate subscriber presence/absence management in a telephone exchanging system and information processing system and a call/electronic mail transfer control by linking the telephone exchanging system with the information processing system, so that the subscriber presence/absence management and the transfer control can be performed by operating either a telephone or a computer terminal.

It is another object of the present invention to achieve subscriber presence/absence management and call/electronic mail transfer control by performing an ordinary telephone operation or an ordinary terminal input operation without performing intentional registration operations related to the subscriber presence/absence management and transfer control.

In accordance with one aspect of the present invention, there is provided a call transfer system comprising: an information processing system accommodating a plurality of terminals each having input means; and a telephone exchanging system accommodating a plurality of telephones preliminarily interrelated to the respective terminals; the information processing system monitoring an input operation performed by the input means of each of the terminals, and transmitting information indicative of the input operation to the telephone exchanging system; the telephone exchanging system controlling a call transfer operation, based on the information indicative of the input operation transmitted from the information processing system, to transfer a call received by a telephone to a predetermined transfer destination if no input operation is performed at a terminal corresponding to the telephone, and not to transfer the call if an input operation is performed at the terminal.

In accordance with another aspect of the present invention, there is provided an electronic mail transfer system comprising: an information processing system accommodating a plurality of terminals and having an electronic mail transmitting function; and a telephone exchanging system accommodating a plurality of telephones preliminarily interrelated to the respective terminals and each having input means; the telephone exchanging system monitoring an input operation performed by the input means of each of the telephones and transmitting information indicative of the input operation to the information processing system; the information processing system controlling an electronic mail transfer operation, based on the information indicative of the input operation transmitted from the telephone exchanging system, to transfer an electronic mail destined for a terminal to a predetermined transfer destination if no input operation is performed at a telephone corresponding to the terminal, and not to transfer the electronic mail if an input operation is performed at the telephone.

In the call transfer system and electronic mail transfer system of the present invention, the telephone exchanging system and the information processing system are linked with each other, so that the telephone exchanging system controls a call transfer operation based on information input from a terminal and the information processing system controls an electronic mail transfer operation based on information input from a telephone. Therefore, the subscriber presence/absence management and call/electronic mail transfer functions of the telephone exchanging system and the information processing system can be more readily performed by way of an unintentional input operation usually performed at the telephone or terminal. Thus, the present invention significantly contributes to improve the workability of the subscriber presence/absence management and call/electronic mail transfer functions in an environment where each user has both a telephone and a computer terminal.

BRIEF DESCRIPTION OF THE DRAWINGS

FIGS. 8A–8D are a diagram illustrating structures of data to be stored in a data section 76 of the TS 53 in the present invention;

FIG. 10 is a diagram illustrating response delay transfer condition data B-12 in accordance with EMBODIMENT 1;

FIG. 12 is a diagram illustrating a message transmitted between a computer terminal (DTE) 54 and the TS 53 in the present invention;

FIG. 13 is a diagram illustrating a message transmitted between the PBX 51 and the TS 53 in the present invention;

FIG. 17 is a diagram illustrating another information transmission process sequence in accordance with EMBODIMENT 4;

FIG. 18 is a diagram illustrating an information transmission process sequence in accordance with EMBODIMENT 5;

FIG. 19 is a diagram illustrating an information transmission process sequence in accordance with EMBODIMENT 6; and FIG. 20 is a diagram illustrating an information transmission process sequence in accordance with EMBODIMENT 7.

DESCRIPTION OF THE PREFERRED EMBODIMENTS

In a call transfer system of the present invention, an information processing system accommodating a plurality of terminals monitors an input operation performed at each of the terminals, and a telephone exchanging system accommodating a plurality of telephones and having a subscriber presence/absence management function controls the transfer of a call received by a telephone, based on information indicative of an input operation transmitted from a terminal preliminarily interrelated to the telephone and accommodated in the information processing system.

In an electronic mail transfer system of the present invention, a telephone exchanging system accommodating a plurality of telephones monitors an input operation performed at each of the telephones, and an information processing system accommodating a plurality of terminals and having an electronic mail transmitting function controls the transfer of an electronic mail destined for a terminal, based on information indicative of an input operation transmitted from a telephone preliminarily interrelated to the terminal.

Figure 1:
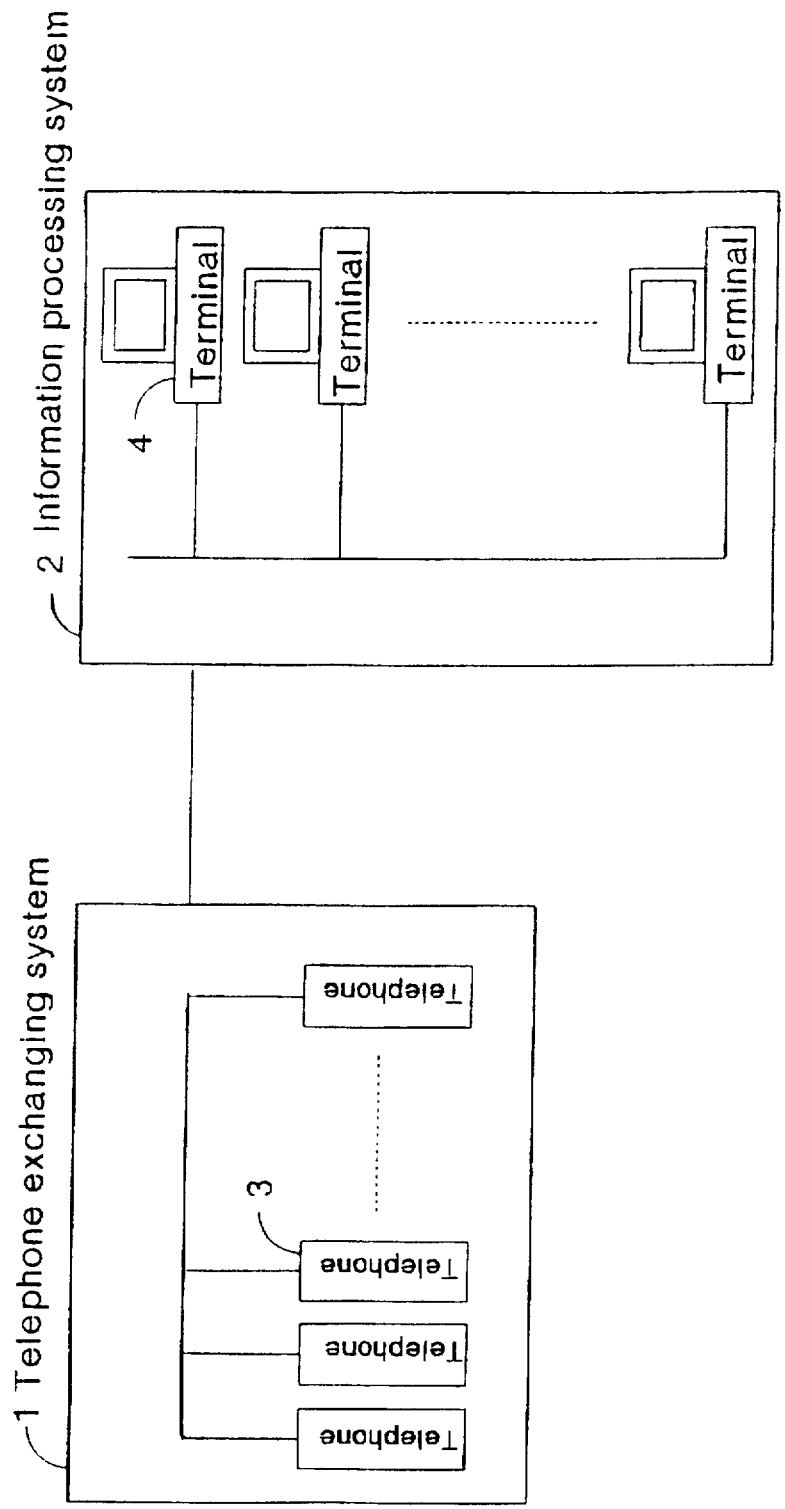
FIG. 1 is a block diagram illustrating a fundamental construction in accordance with the present invention.

FIG. 1 is a block diagram illustrating a fundamental construction in accordance with the present invention. As shown, a call transfer system of the present invention has an information processing system 2 accommodating a plurality of terminals each having input means, and a telephone exchanging system 1 accommodating telephones 3 preliminarily interrelated to the respective terminals 4. The information processing system 2 monitors an input operation performed by the input means of each of the terminals and transmits information indicative of the input operation to the telephone exchanging system 1. The telephone exchanging system 1 controls a call transfer operation, based on the information indicative of the input operation transmitted from the information processing system 2, to transfer a call received by a telephone to a predetermined transfer destination if no input operation is performed at a terminal corresponding to the telephone, and not to transfer the call if an input operation is performed at the terminal.

An electronic mail transfer system of the present invention has an information processing system 2 accommodating a plurality of terminals 4 and having an electric mail transmitting function, and a telephone exchanging system 1 accommodating a plurality of telephones 3 preliminarily interrelated to the respective terminals 4 and each having input means. The telephone exchanging system 1 monitors an input operation performed by the input means of each of the telephones and transmits information indicative of the input operation to the information processing system 2. The information processing system 2 controls an electronic mail transfer operation, based on the information indicative of the input operation transmitted from the telephone exchanging system 1, to transfer an electronic mail destined for a terminal to a predetermined transfer destination if no input operation is performed at a telephone corresponding to the terminal, and not to transfer the electronic mail if an input operation is performed at the telephone.

Figure 2:
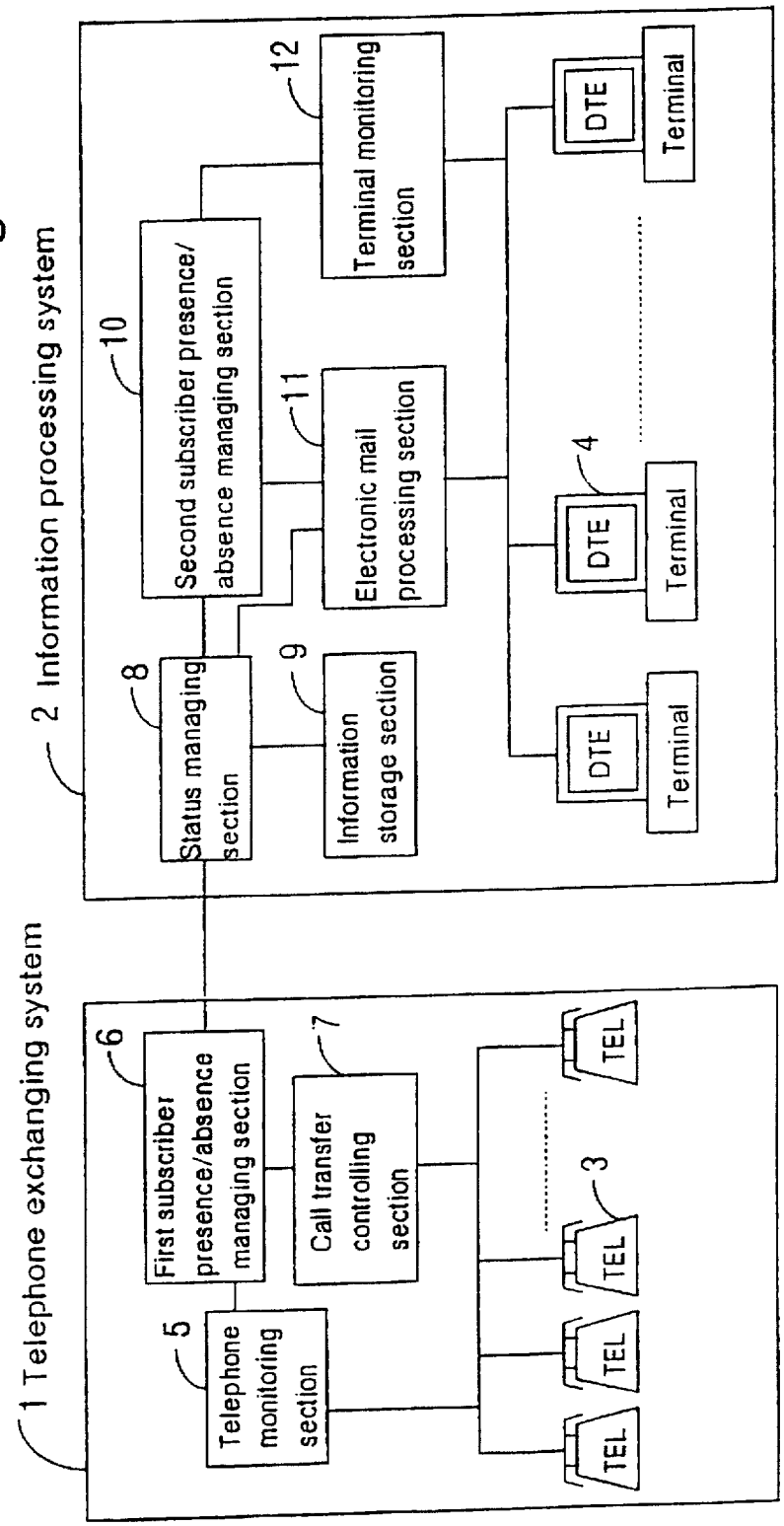
FIG. 2 is a block diagram illustrating a detailed fundamental construction in accordance with the present invention.

FIG. 2 is a block diagram illustrating a detailed fundamental construction in accordance with the present invention. As shown, the telephone exchanging system 1 includes a telephone monitoring section 5 for monitoring an input operation performed at each telephone 3, a first subscriber presence/absence managing section 6 for performing subscriber presence/absence management in the telephone exchanging system 1, and a call transfer controlling section 7 for controlling a transfer operation of a call received by a telephone.

The information processing system 2 includes a terminal monitoring section 12 for monitoring an input operation performed at each terminal 4, a second subscriber presence/absence managing section 10 for performing subscriber presence/absence management in the information processing system 2, an electronic mail processing section 11 for controlling a transfer operation of an electronic mail to be transferred between terminals, a status managing section 8 for managing the statuses of the telephones 3 and terminals 4 based on subscriber presence/absence information obtained from the first and second subscriber presence/absence managing sections 6 and 10, and an information storage section 9 for storing therein the subscriber presence/absence information and data of transfer conditions including a transfer destination. With such a construction, the call transfer system can control the transfer operation of a call received by a telephone corresponding to a particular terminal.

Where a predetermined time has passed since the terminal monitoring section 12 detected the last input operation at a terminal DTE, the second subscriber presence/absence managing section 10 transmits to the status managing section 8 information indicating that a subscriber of the terminal DTE is possibly absent. The status managing section 8 further transmits to the first subscriber presence/absence managing section 6 the information indicative of the possibility of the subscriber absence along with transfer destination data and preset time data for response delay transfer to be performed by a telephone TEL corresponding to the terminal DTE which data are preliminarily stored in the information storage section 9. Upon receiving the information and the data, the first subscriber presence/absence managing section 6 changes the status of the telephone TEL to a subscriber possibly absent status and changes the transfer destination of a call received by the telephone TEL to that specified by the transfer destination data.

If the terminal monitoring section 12 detects an input operation performed at a terminal DTE when the terminal DTE is in a subscriber absent status, the second subscriber presence/absence managing section 10 transmits to the status managing section 8 information indicating that the terminal DTE is in a subscriber present status. The status managing section 8 further transmits to the first subscriber presence/absence managing section 6 the subscriber presence information along with information concerning a telephone TEL corresponding to the terminal DTE. Upon receiving the information, the first subscriber presence/absence managing section 6 changes the status of the telephone TEL to a subscriber present status.

The status managing section 8 preferably includes timer means for measuring an elapsed time after receiving the information indicative of the possibility of the subscriber absence from the second subscriber presence/absence managing section 10, and registration means for registering information. The registration means preliminarily registers a plurality of transfer destination data corresponding to preset lengths of time elapse in the information storage section 9, and the status managing section 8 selects transfer destination data to be transmitted to the first subscriber presence/absence managing section 6, depending on the length of the elapsed time measured by the timer means.

The registration means of the status managing section 8 may preliminarily register a plurality of preset timing data for response delay transfer corresponding to the preset lengths of time elapse in the information storage section 9, and the status managing section 8 may select preset timing data to be transmitted to the first subscriber presence/absence managing section 6, depending on the length of the elapsed time measured by the timer means.

In the call transfer system of the present invention, where the input operation at the terminal DTE is a power-on operation, the telephone exchanging system 1 sets the status of the telephone TEL corresponding to the terminal DTE to the subscriber present status, and controls the telephone TEL not to transfer the call received by the telephone TEL.

In the call transfer system of the present invention, where the input operation at the terminal DTE is a power-off operation, the telephone exchanging system 1 sets the status of the telephone TEL corresponding to the terminal DTE to the subscriber absent status, and controls the telephone TEL to transfer the call received by the telephone TEL.

In the call transfer system of the present invention, where the second subscriber presence/absence managing section 10 detects a subscriber possibly absent status which indicates that a predetermined time has passed since the last input operation was performed at a terminal DTE, the second subscriber presence/absence managing section 10 transmits to the first subscriber presence/absence managing section 6 information indicative of the subscriber possibly absent status of the terminal DTE. Upon receiving the information indicative of the subscriber possibly absent status, the first subscriber presence/absence managing section 6 allows a telephone TEL corresponding to the terminal DTE to ring. If a response operation to the ring is performed at the telephone TEL, the first subscriber presence/absence managing section 6 judges that the telephone TEL is in the subscriber present status, and controls the telephone TEL not to transfer a call received by the telephone TEL.

In this case, the first subscriber presence/absence managing section 6 of the telephone exchanging system 1 preferably notifies the second subscriber presence/absence managing section 10 of the information processing system 2 that the telephone TEL is in the subscriber present status, and the second subscriber presence/absence managing section 10 controls the terminal DTE corresponding to the telephone TEL not to transfer an electronic mail destined for the terminal DTE.

On the other hand, if the subscriber of the telephone TEL does not respond to the ring of the telephone TEL, the first subscriber presence/absence managing section 6 judges that the telephone TEL is in the subscriber absent status, and controls the telephone TEL to transfer the call received by the telephone TEL to a predetermined call transfer destination.

In this case, the first subscriber presence/absence managing section 6 of the telephone exchanging system 1 preferably notifies the second subscriber presence/absence managing section 10 of the information processing system 2 that the telephone TEL is in the subscriber absent status, and the second subscriber presence/absence managing section 10 controls the terminal DTE corresponding to the telephone TEL to transfer the electronic mail destined for the terminal DTE to a predetermined electronic mail transfer destination.

In the electronic mail transfer system of the present invention, when an input operation is performed at a telephone TEL in a state where an absent subscriber electronic mail transfer function of a terminal DTE corresponding to the telephone TEL is turned on in the information processing system 2, the telephone exchanging system 1 transmits to the information processing system 2 information indicating that the input operation is performed at the telephone TEL. Upon receiving the information, the information processing system 2 controls the terminal DTE not to transfer the electronic mail destined for the terminal DTE to another terminal.

In the electronic mail transfer system of the present invention, where the telephone exchanging system 1 detects an input operation performed at a telephone TEL when the telephone TEL is in a subscriber absent status, the telephone exchanging system 1 preferably transmits to the information processing system 2 information indicating that a subscriber of the telephone TEL is present at the telephone TEL. Upon receiving the information, the information processing system 2 preferably sets the status of a terminal DTE corresponding to the telephone TEL to a subscriber present status, and controls the terminal DTE not to transfer an electronic mail destined for the terminal DTE.

In the electronic mail transfer system of the present invention, where the telephone exchanging system 1 finds that the status of a telephone TEL is changed to the subscriber present status or to the subscriber absent status, the telephone exchanging system 1 may transmit information concerning the change in the status to the information processing system 2. Upon receiving the information, the information processing system 2 may transmit information indicating that the status of the telephone TEL is changed to the subscriber present status or to the subscriber absent status in the form of an electronic mail to terminals other than the terminal DTE corresponding to the telephone TEL.

In the electronic mail transfer system of the present invention, the telephone exchanging system 1 includes a first subscriber presence/absence managing section 6 for performing subscriber presence/absence management in the telephone exchanging system 1, and the information processing system 2 includes a second subscriber presence/absence managing section 10 for performing subscriber presence/absence management in the information processing system 2, an electronic mail processing section 11 for controlling a transfer operation of an electronic mail to be transferred between terminals, a status managing section 8 for managing the statuses of the telephones 3 and terminals 4 based on subscriber presence/absence information obtained from the first and second subscriber presence/absence managing sections 6 and 10, and an information storage section 9 for storing therein the subscriber presence/absence information and transfer conditions. With such a construction, the electronic mail transfer system can control the transfer operation of an electronic mail destined for a terminal corresponding to a particular telephone.

In the electronic mail transfer system of the present invention, the information storage section 9 may preliminarily store therein information on a telephone TEL and data pairs of reasons of subscriber absence at the telephone TEL and addresses of electronic mail transfer destinations. When a subscriber absent status is registered from the telephone TEL along with a reason of the subscriber absence, the first subscriber presence/absence managing section 6 may transmit to the status managing section 8 information on the subscriber absence registration including the reason of the subscriber absence, then the status managing section 8 may retrieve an address of an electronic mail transfer destination corresponding to the reason of the subscriber absence from the information storage section 9, and the second subscriber presence/absence managing section 10 may transmit information on the address of the transfer destination and the subscriber absence registration to a terminal DTE corresponding to the telephone TEL.

The telephone exchanging system 1 shown in FIGS. 1 and 2 has an electronic exchange as a core system and a plurality of telephones 3 connected thereto. The electronic exchange may be an exchanger provided in an exchanging station accommodating public phone lines or, alternatively, a private branch exchange (PBX) in a company within a building. The information processing system 2 is preferably a system comprising a plurality of computer terminals 4 (hereinafter referred to simply as "terminals") hooked up to a network, and has a so-called server for managing data transmission among the terminals 4 in the network.

The network may be any network such as WAN, LAN or ethernet or token-ring network in an LAN.

The server preferably has a function of communicating with the electronic exchange, and transmits to the terminals 4 or to the telephone exchanging system 1 accommodating the telephones 3 information indicative of an input operation obtained from the telephones 3 or the terminals 4.

Usable as the terminals (DTE) 4 are personal computers, workstations and the like which have a networking function.

The telephone monitoring section 5, first subscriber presence/absence monitoring section 6 and call transfer controlling section 7 shown in FIG. 2 are preferably provided in the electronic exchange, and each comprises hardware including a CPU, an ROM, an RAM and a timer and a control program to perform its functions.

The telephone monitoring section 5 monitors the use status of each telephone 3 accommodated in the electronic exchange, particularly, an input operation such as off-hook, dialing or registration operation performed at the telephone 3. The registration operation includes operations of inputting a phone number of a transfer destination in case of subscriber absence and for registering a subscriber present/absent status.

The first subscriber presence/absence managing section 6 communicates with the information processing system 2 for the transmission and reception of various information. For example, the first subscriber presence/absence managing section 6 transmits information on the subscriber present/ absent statuses of the telephones 3 to the information processing system 2, and receives information on the subscriber present/absent statuses of the terminals transmitted from the information processing system 2, information on a transfer destination and the like information to manage the subscriber presence/absence in the telephone exchanging system.

The call transfer controlling section 7 controls a transfer operation of a call received by a telephone, based on the information transmitted from the first subscriber presence/absence managing section 6.

The status managing section 8, information storage section 9, second subscriber absence/presence managing section 10, electronic mail processing section 11 and terminal monitoring section 12 constitute the information processing system 2 shown in FIG. 2, and each comprises hardware including a CPU, an ROM, an RAM and a timer and a control software to perform its functions.

The state managing section 8 communicates with the first subscriber presence/absence managing section 6 for information transmission, and serves as a liaison between the telephone exchanging system 1 and information processing system 2 for the subscriber presence/absence management based on the information concerning the subscriber presence/absence management in the telephone exchanging system 1 and the information processing system 2.

The information storage section 9 stores therein information necessary for the subscriber presence/absence management, for example, data concerning the subscriber present/absent status of a telephone, conditions for response delay transfer to be performed at the telephone, and an electronic mail transfer destination, and data necessary for specifying a one-to-one correspondence between the telephones 3 and the terminals 4.

The second subscriber presence/absence managing section 10 manages the subscriber present/absent status of each terminal 4, and has a function of determining an electronic mail transfer destination based on the information obtained from the status managing section 8, and a function of judging whether the subscriber of the terminal 4 is present or absent based on the information obtained from the terminal monitoring section 12.

The electronic mail processing section 11 delivers an electronic mail to a terminal. This function is conventionally served by a LAN.

The terminal monitoring section 12 monitors the use status of each terminal 4, particularly, an input operation performed by way of an input device such as keyboard or mouse of the terminal 4.

The telephone exchanging system 1 and the information processing system 2 are preferably connected to each other over a private line which comprises a line for transmitting line information and several control lines for transfer control. The transfer control may be achieved by a commonly used procedure.

The status managing section 8, information storage section 9, second subscriber presence/absence managing section 10, electronic mail processing section 11 and terminal monitoring section 12 are preferably provided in the server.

The second subscriber presence/absence managing section 10, electronic mail processing section 11 and terminal processing section 12 may otherwise be provided in the respective terminals 4 or both in the server and in the terminals.

The present invention will hereinafter be described by way of preferred embodiments thereof as illustrated in the attached drawings. It should be noted that the preferred embodiments herein described are not limitative of the present invention.

Figure 3:
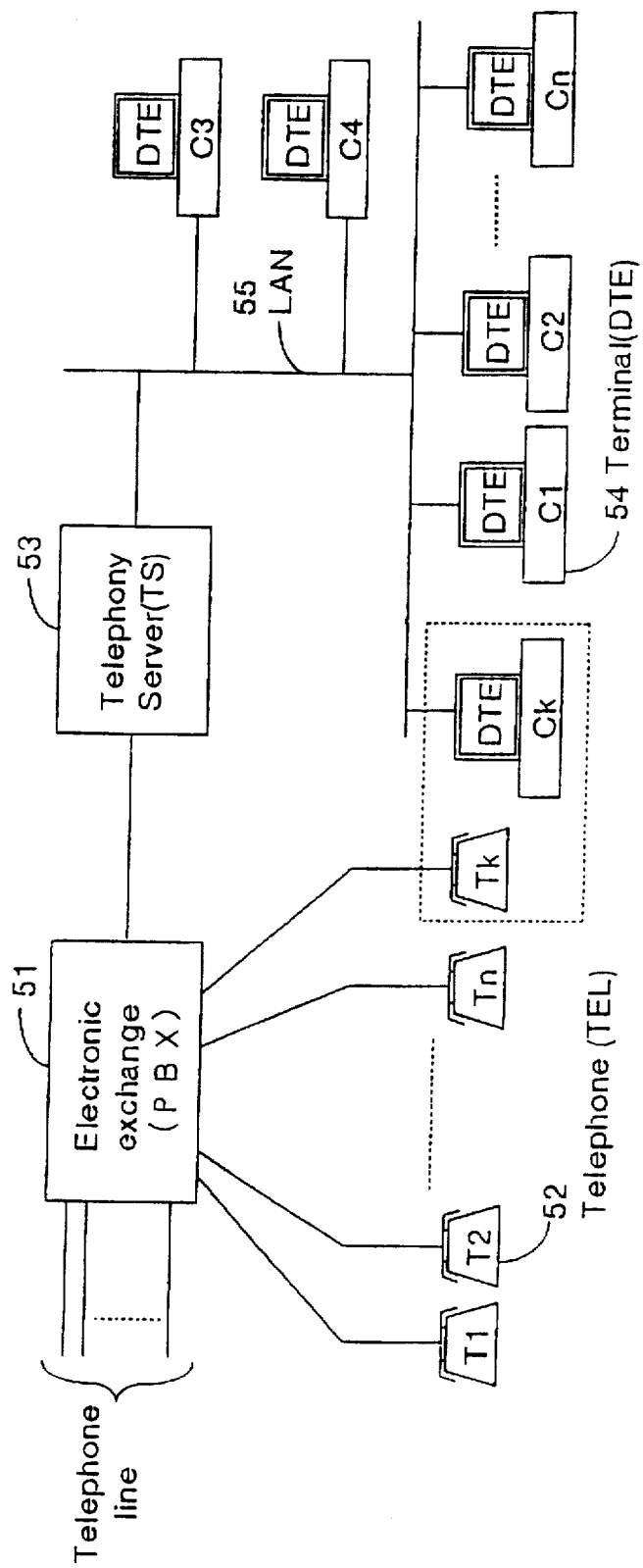
FIG. 3 is a block diagram illustrating a system construction in accordance with one embodiment of the present invention.

FIG. 3 is a block diagram illustrating a system construction in accordance with one embodiment of the present invention.

An electronic exchange 51 may be an exchanger provided in an exchange station but, in this embodiment, is a private branch exchange (PBX). The PBX 51 is connected to a plurality of telephones 52 (TEL: T1 to Tn).

A telephony server (TS) 53 is located in an information processing system, and connects a telephone exchanging system having the PBX 51 as a core system to the information processing system having a plurality of computer terminals (DTE) 54, thereby coordinating the subscriber presence/absence management functions of the telephone exchanging system and the information processing system to realize more convenient call/electronic mail transfer.

The computer terminals 54 (DTE: C1 to Cn) are linked to each other over a computer network such as LAN. The PBX 51 and TS 53 are connected to each other, for example, over a private line, and control information is preferably transmitted bidirectionally therebetween by using a general protocol such as HDLC.

The TS 53 is one terminal hooked up to the network to which the terminals 54 are linked, and serves as a so-called server of the information processing system to control the terminals 54 for the subscriber presence/absence management, the electronic mail transfer and the like.

The LAN 55 is not limited to ethernet, token-ring, Apple-Talk and the like, but may be any kind of LAN capable of transmitting information between terminals.

The PBX 51 has a subscriber presence/absence registration function and a call transfer function which allows a call received by a telephone to be transferred to a preliminarily registered transfer destination if a subscriber absence registration for the telephone has been made.

The information processing system in which the terminals 54 are linked over the LAN has a function of transmitting an electronic mail from one terminal to another terminal, a terminal subscriber presence/absence registration function, and an absent subscriber electronic mail transfer function.

Since the present invention is intended to facilitate information processing to be performed when a subscriber of a telephone or terminal is present or absent by linking the telephone exchanging system with information processing system, it is preferred that each user of these systems is a subscriber of one telephone Tk and one terminal Ck which are located as close to each other as possible for effective subscriber presence/absence management.

As described above, one user preferably owns one telephone and one terminal. If it is difficult to provide users with sufficient equipment, one telephone and one terminal may be shared by a group of several users and, in this case, the relationship between the telephone/terminal and the users may be preliminarily specified.

In this embodiment, one user owns one telephone Tk and one terminal Ck, and the ownership of the telephone Tk and terminal Ck is preliminarily registered.

Figure 4:
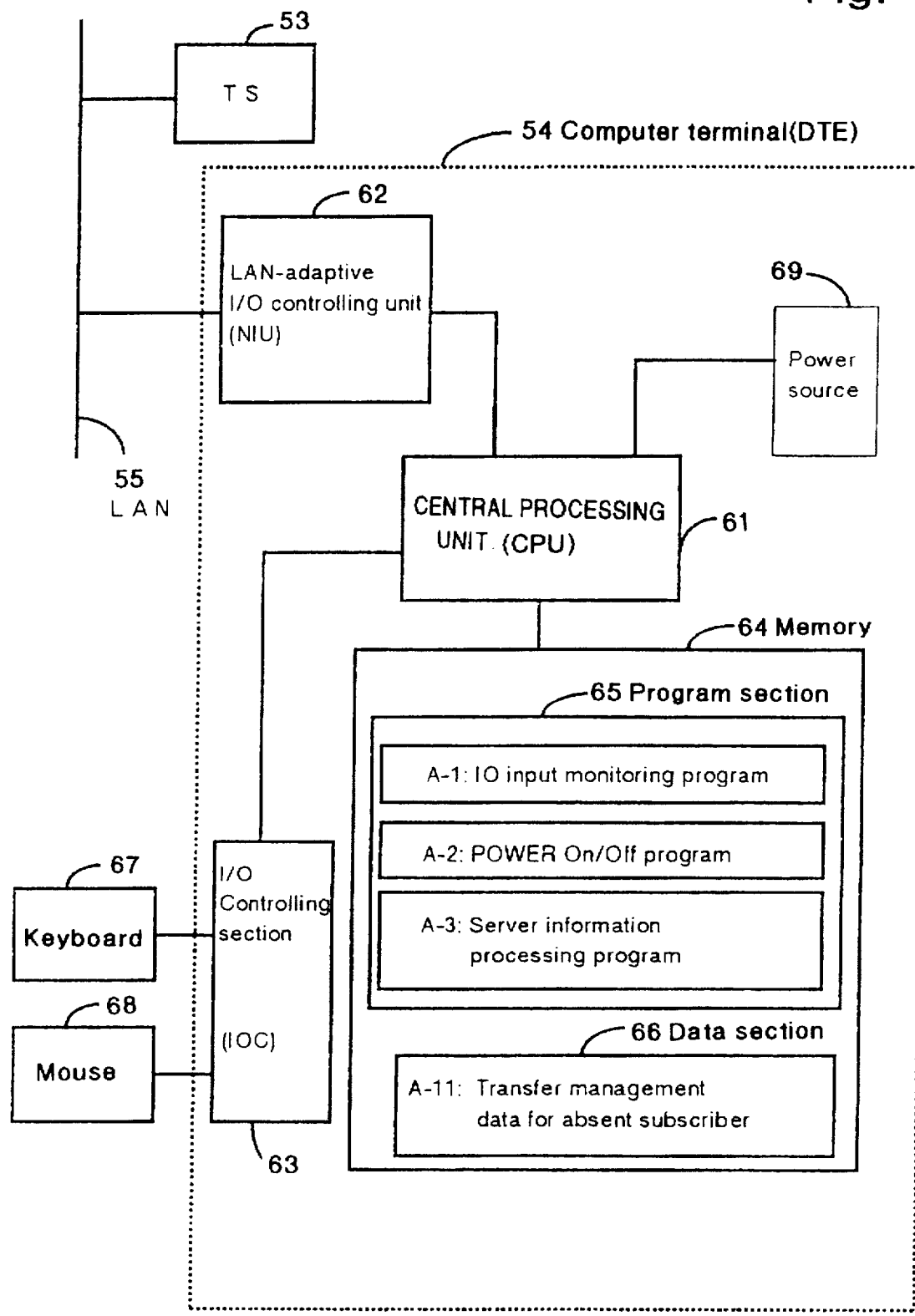
FIG. 4 is a block diagram illustrating the construction of a computer terminal (DTE) employed in the present invention.

FIG. 4 is a block diagram illustrating the construction of a computer terminal (DTE) 54 employed in this embodiment. As shown, the DTE 54 has a CPU 61, a LAN-adaptive I/O controlling unit (NIU) 62, an I/O controlling section (IOC) 63, a memory 64, a keyboard 67 and a mouse 68. Other devices necessary for information processing operations such as CRT and printer (not shown) are connected to the I/O controlling section 63. The keyboard 67 and mouse 68 are examples of input means, and not limited thereto. Other exemplary input means include a track ball and power switch.

The NIU 62 serves for disassembly and assembly of data for data communications with the LAN 55, and controls the data communications in compliance with a predetermined standard protocol.

The memory 64 generally comprising an ROM and an RAM has a program section 65 and a data section 66. The program section 65 is typically disposed in the ROM, but may be disposed in the RAM for easy modification of programs stored therein. The data section 66 is preferably disposed in the RAM.

The program section 65 stores therein an I/O input monitoring program A-1, a power-on/off program A-2 and a server information processing program A-3.

FIG. 4 shows components only related to the present invention. The program section 65 further stores therein a display control program, a LAN control program, an electronic mail transfer program and the like (not shown). The data section 66 stores therein transfer management data A-11 for absent subscriber.

The I/O input monitoring program A-1 monitors inputs from the keyboard 67, mouse 68, tablet and other input devices. If a predetermined time has passed since a subscriber of the terminal 54 performed the last input operation by means of any of these input devices, the program A-1 judges that the subscriber of the terminal is possibly absent. When the subscriber thereafter performs an input operation, the program A-1 judges that the subscriber is present at the terminal.

The program A-1 transmits the judgment information on the subscriber present/absent status to the TS 53 over the LAN 55.

The power-on/off program A-2 transmits to the TS 53 power-on/off information when the power to the terminal is turned on or off.

The server information processing program A-3 receives information transmitted from the TS 53. The program A-3 also registers data concerning conditions of a transfer operation for an absent subscriber of the terminal 54, i.e., data indicative of the on/off of the transfer function for absent subscriber and an address of a transfer destination, based on the information received from the TS 53 and the transfer management data A-11 for absent subscriber.

Figure 7:
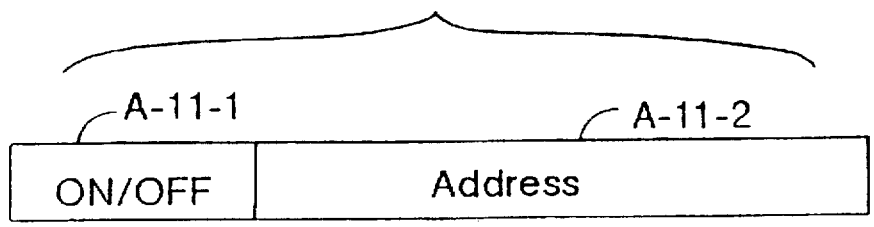
FIG. 7 is a diagram illustrating a structure of transfer management data A-11 for absent subscriber in the present invention.

FIG. 7 is a diagram illustrating a structure of the transfer management data A-11 for absent subscriber stored in the memory 64. The transfer management data A-11 specifies conditions of a transfer operation for an absent subscriber of the terminal 54. When the terminal 54 receives an electronic mail transmitted from another terminal on the LAN, the electronic mail transfer program (not shown) is executed and refers to the data A-11 to transfer the electronic mail to a transfer destination.

The data section 66 of the memory 64 in the terminal 54 further stores therein data of a preset time period which is to be compared with an elapsed time during which no input operation is performed by means of an input device of the terminal 54. The preset time period is preferably registered from an input device of each of the terminals 54.

Figure 5:
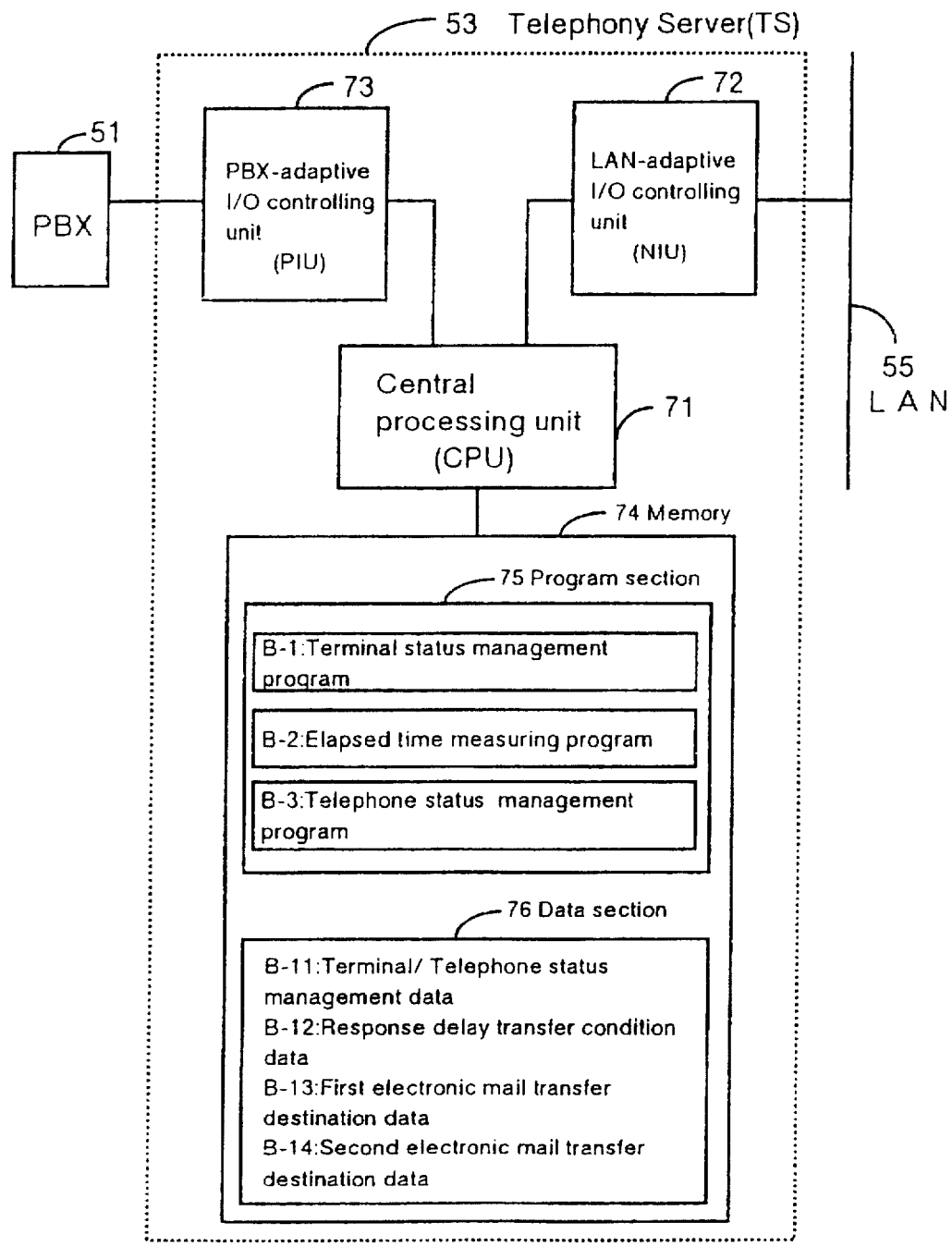
FIG. 5 is a block diagram illustrating the construction of Telephony Server (TS) employed in the present invention.

FIG. 5 is a block diagram illustrating the construction of a telephony server (TS) 53 employed in this embodiment. The TS 53 comprises a CPU 71, a LAN-adaptive I/O controlling unit (NIU) 72, a PBX-adaptive I/O controlling unit (PIU) 73 and a memory 74. The NIU 72 and PIU 73 serve for disassembly and assembly of data for data communications between the LAN 55 and the PBX 51, and control the data communications in compliance with a predetermined standard protocol.

The memory 74 comprising an ROM and an RAM has a program section 75 and a data section 76. The program section 75 stores therein a terminal status management program B-1, an elapsed time measuring program B-2 and a telephone status management program B-3.

The data section 76 stores therein terminal/telephone status management data B-11, response delay transfer condition data B-12, first electronic mail transfer destination data B13, second electronic mail transfer destination data B-14 and other data necessary for the execution of the aforesaid programs.

The terminal status management program B-1 receives and processes data transmitted from a terminal 54 over the LAN 55.

More specifically, the program B-1 manages the subscriber present/absent status of the terminals 54 using the terminal/telephone status management data B-11. Further, the program B-1 determines conditions for the response delay transfer operation and the absent subscriber transfer operation to be performed by the electronic exchange, and transmits the information concerning the conditions thus determined to the PBX 51.

The elapsed time measuring program B-2 measures an elapsed time after the status of a telephone or terminal of a subscriber is changed into a "subscriber possibly absent status", by using the terminal/telephone status management data B-11. Further, the program B-2 selectes, based on the elapsed time, a response delay transfer time and a response delay transfer destination telephone from the response delay transfer condition data B-12, and transmits the data thus determined to the PBX 51.

The telephone status management program B-3 receives and processes information transmitted from the PBX 51. More specifically, the program B-3 registers information on the subscriber present/absent status of a telephone as the terminal/telephone status management data B-11 and transmits the information to a terminal corresponding to the telephone.

FIGS. 8 (a),(b),(c), and (d) is a diagram illustrating structures of data to be stored in the data section 76 of the TS 53. The terminal/telephone status management data B-11 (FIG. 8 (a)) is used to manage the statuses of terminals and telephones, and includes a data field B-11-1 for an ID number unique to a terminal or a telephone, a data field B-11-2 for the status of the terminal or telephone, a data field B-11-3 for date and time at which a subscriber presence/absence registration is made, a data field B-11-4 for an elapsed time after the last input operation is performed at the terminal, and a data field B-11-5 for a record number which is referred to in the response delay transfer condition data B-12 for the last transfer operation.

Data to be written in the data field B-11-2 for the status of the terminal or telephone includes three statuses, i.e., "subscriber present status", "subscriber absent status" and "subscriber possibly absent status", which are assigned values, for example, "00H", "01H" and "02H", respectively.

The response delay transfer condition data B-12 (FIG. 8 (b)) includes registration information concerning a call received by a telephone. More specifically, the data B-12 includes a data field B-12-1 for an ID number unique to a terminal or telephone, data fields B-12-3 (TIME1) and B-12-4 (TIME2) for upper time limit and lower time limit to be compared with the elapsed time written in the data field B-11-4, a data field B-12-5 for a preset time, and a data field B-12-6 for a call transfer destination number.

The preset time written in the data field B-12-5 specifies a wait time for transmitting a call received by a telephone in a subscriber absent status.

The first electronic mail transfer data B-13 (FIG. 8 (c)) includes a data field B-13-1 for an ID number unique to a terminal, a data field B-13-2 for a reason for transfer at the time when a subscriber absence registration is made at a corresponding telephone, and a data field B-13-3 for an address of an electronic mail transfer destination for the transfer reason.

The second electronic mail transfer data B-14 (FIG. 8 (d)) includes a data field B-4-1 for an ID number unique to a terminal, a data field B-14-2 for a transfer destination number registered in a corresponding telephone, and a data field B-14-3 for an electronic mail transfer destination address.

Figure 6:
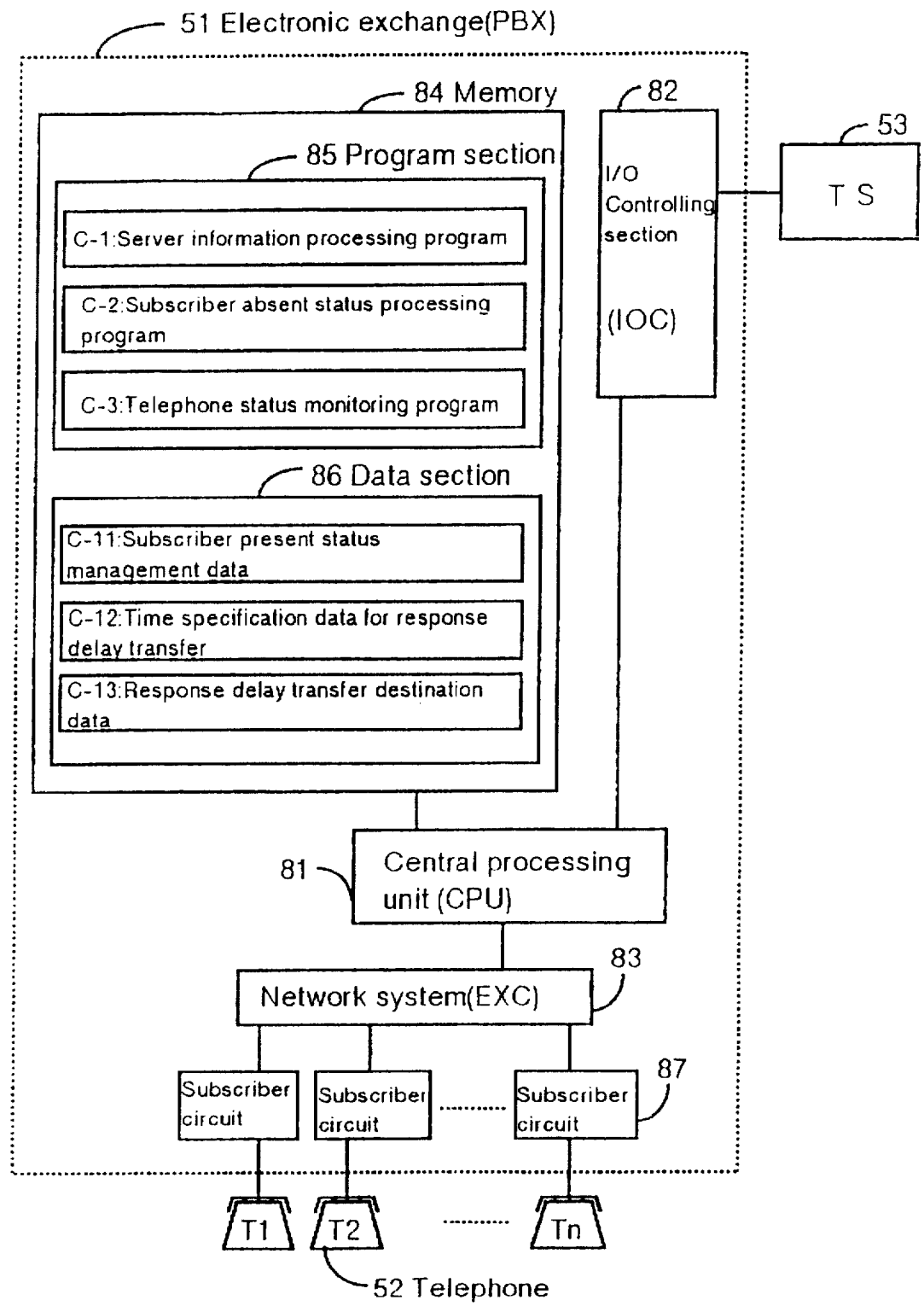
FIG. 6 is a block diagram illustrating the construction of an electronic exchange (PBX) employed in the present invention.

FIG. 6 is a block diagram illustrating the construction of the electronic exchange (PBX) 51 employed in this embodiment. The PBX 51 includes a CPU 81, an I/O controlling section (IOC) 82, a network system (EXC) 83, subscriber circuits 87 and a memory 84.

The IOC 82 serves for disassembly and assembly of data for data communications with the TS 53, and controls the data communications in compliance with a predetermined standard protocol. The IOC 82 is preferably connected to the TS 53 over a private line.

The IOC 82 and EXC 83 perform a telephone exchanging operation which is a main function of the electronic exchange.

The subscriber circuits 87 are connected to the respective telephones 52 and perform a transmission control and reception control of the telephones 52.

The memory 84 comprising an ROM and an RAM has a program section 85 and data section 86. The program section 85 stores therein a server information processing program C-1, a subscriber absence processing program C-2 a telephone status monitoring program C-3 and a call transfer program (not shown). The data section 86 stores therein subscriber present status management data C-11, response delay transfer time specification data C-12, response delay transfer destination data C-13, and other data necessary for the execution of the aforesaid programs.

The server information processing program C-1 receives and processes information transmitted from the TS 53. More specifically, the program C-1 registers the subscriber present/absent status of each telephone in the subscriber present status management data C-11, a response delay transfer time for each telephone in the response delay transfer time specification data C-12, and a transfer destination number for each telephone in the response delay transfer destination data C-13.

The subscriber absent status processing program C-2 performs the subscriber presence/absence management at the side of the PBX 51. More specifically, the program C-2 registers a subscriber present/absent status of a telephone in the subscriber present status management data C-11 and transmits the subscriber present/absent status to the TS 53 when a subscriber presence/absence registering operation is performed at the telephone.

The telephone status monitoring program C-3 monitors the status of each telephone. More specifically, the program C-3 monitors an input operation such as off-hook, dialing or functional button operation performed at each telephone.

Where the program C-3 detects an input operation as described above performed at a telephone when the telephone Is in a "subscriber absent status" or "subscriber possibly absent status", the program C-3 transmits to the TS 53 information indicating that the subscriber of the telephone is present.

Figure 9A:
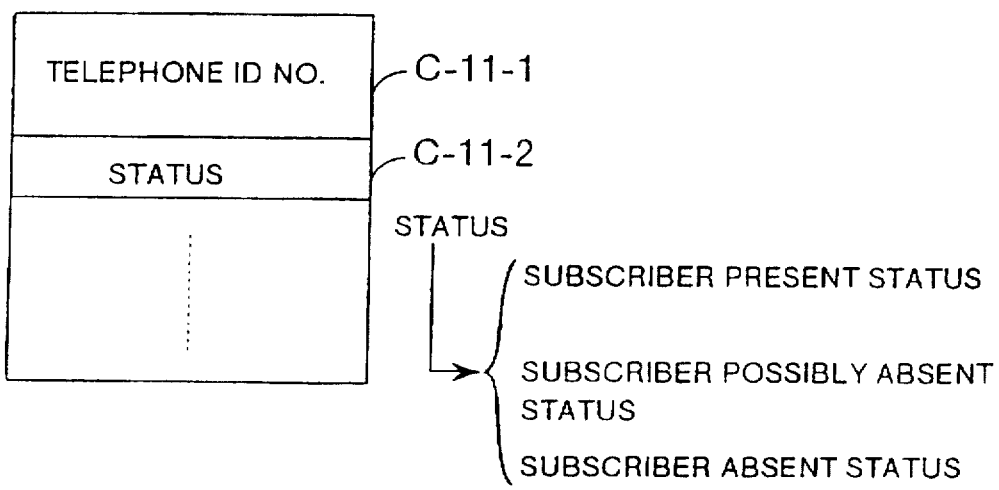
FIGS. 9A–9C are a diagram illustrating structures of data to be stored in a data section 86 of the PBX 51 in the present invention.
Figure 9B:
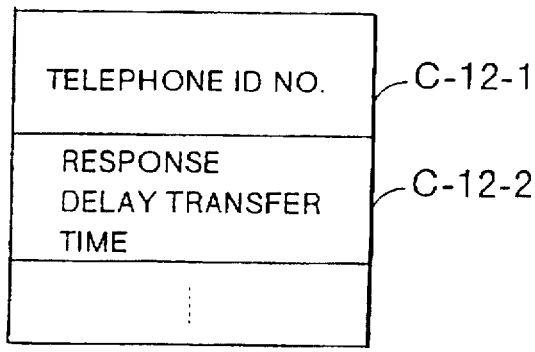
Figure 9C:
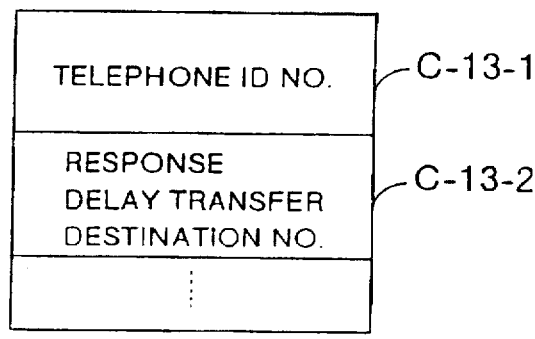

FIGS. 9 (a),(b), and (c) is a diagram illustrating structures of data to be stored in the data section 86 of the PBX 51.

The subscriber present status management data C-11 (FIG. 9 (a)) is registration data indicative of the status of each telephone, and includes a data field C-11-1 for an ID number of a telephone and a data field C-11-2 for the status of the telephone. Data to be written in the data field C-11-2 for the status of a telephone includes three statuses, i.e., a "subscriber present status", "subscriber absent status" and "subscriber possibly absent status".

The response delay transfer time specification data C-12 (FIG. 9 (b)) includes a data field C-12-1 for an ID number of a telephone and a data field C-12-2 for a wait time from the reception of a call by the telephone to the transfer of the received call.

The response delay transfer destination data C-13 (FIG. 9 (c) includes a data field C-13-1 for an ID number of a telephone and a data field C-13-2 for a transfer destination number to which a call received by the telephone is to be transferred.

The features of the transfer system of the present invention are the I/O input monitoring program A-1 and server information processing program A-3 in the terminals (DTE), the terminal status management program B-1, elapsed time measuring program B-2 and telephone status management program B-3 in the TS 53, and the subscriber absence processing program C-2 in the PBX 51.

The transfer system of the present invention realizes a call/electronic mail transfer by coordinating the operations of these programs to transfer necessary control data.

EMBODIMENT 1

An explanation will be given to a transfer control of a call received by a telephone in accordance with EMBODIMENT 1. In the call transfer control of EMBODIMENT 1, an input operation performed by means of an input device connected to a terminal is monitored, and a subscriber present/absent status is managed on the basis of the input operation to control the transfer of a call received by a telephone corresponding to the terminal.

It is herein assumed that a subscriber owning both a terminal DTE1 and a telephone T1 is usually present in a place in which the terminal DTE1 and telephone T1 are installed. It is further assumed that response delay transfer condition data B-12 concerning the DTE1 is registered in the data section 76 of the TS 53 as shown in FIG. 10.

The data B-12 is preliminarily input from an input device such as a keyboard 67 or mouse 68 of the terminal DTE1.

As shown in a record indicated by a record number (B-12-2) of "01", a call received by the telephone T1 owned by the subscriber is to be transferred to a telephone T2 owned by his secretary as specified as the response delay transfer destination (B-12-6) when a time of 0 minute (=TIME1: B-12-3) to 10 minutes (=TIME2: B-12-4) passes after the telephone T1 is put in a subscriber possibly absent status. In this case, the preset time (B-12-5) for response delay transfer is 30 seconds.

As shown in a record indicated by a record number (B-12-2) of "02", the transfer destination (B-12-6) is a handy phone T3 and the preset time (B-12-5) for response delay transfer is 10 seconds where the elapsed time is 10 minutes (=TIME1: B-12-3) to 30 minutes (=TIME2: B-12-4).

As shown in a record indicated by a record number (B-12-2) of "03", the transfer destination (B-12-6) is a voice mail system and the preset time (B-12-5) for response delay transfer is 5 seconds where the elapsed time is longer than 30 minutes (=TIME1: B-12-3).

The aforesaid voice mail system is provided in the PBX, and serves to respond to a call by a voice massage prepared in the PBX when the subscriber of the telephone T1 is absent.

These records are registered for the subscriber possibly absent status of the telephone T1. A record is preferably registered for a subscriber present status of the telephone T1 in a similar manner. As shown in a record indicated by a record number (B-12-2) of "00", for example, a preset time (B-12-5) of 60 seconds and a transfer destination (B-12-6) of the voice mail system are registered for the subscriber present status of the telephone T1.

The preset time (B-12-5) of 60 seconds which is longer than that for the subscriber possibly absent status is intended for the prevention of a call transfer in the subscriber present status. The registration data for the subscriber present status is preferably set as a default value.

As shown in the records, the preset time (B-12-5) for response delay transfer varies depending on the elapsed time after the telephone T1 is put in the subscriber possibly absent status. This is based on the theory that the possibility of subscriber absence becomes higher as the elapsed time becomes longer. Therefore, the preset time (B-12-5), i.e., the response delay transfer time (C-12-2) is set shorter as the elapsed time becomes longer, so that a call received by the telephone T1 can be transferred as soon as possible.

In a similar manner, the transfer destination (B-12-6) is also changed depending on the elapsed time.

In this embodiment, the transfer destination is "secretary" where the time elapse is relatively short. Alternatively, the transfer destination may be a telephone located closest to the telephone T1 of the subscriber or located in the same division in case that the secretary is absent. Where the time elapse is relatively long, the transfer destination is preferably a handy phone as stated above or, alternatively, may be an ordinary desk-top telephone.

Since the response delay transfer time and the transfer destination are variously set depending on the time elapse, the present invention provides a more convenient communication function to users of the telephone exchanging system.

Figure 11:
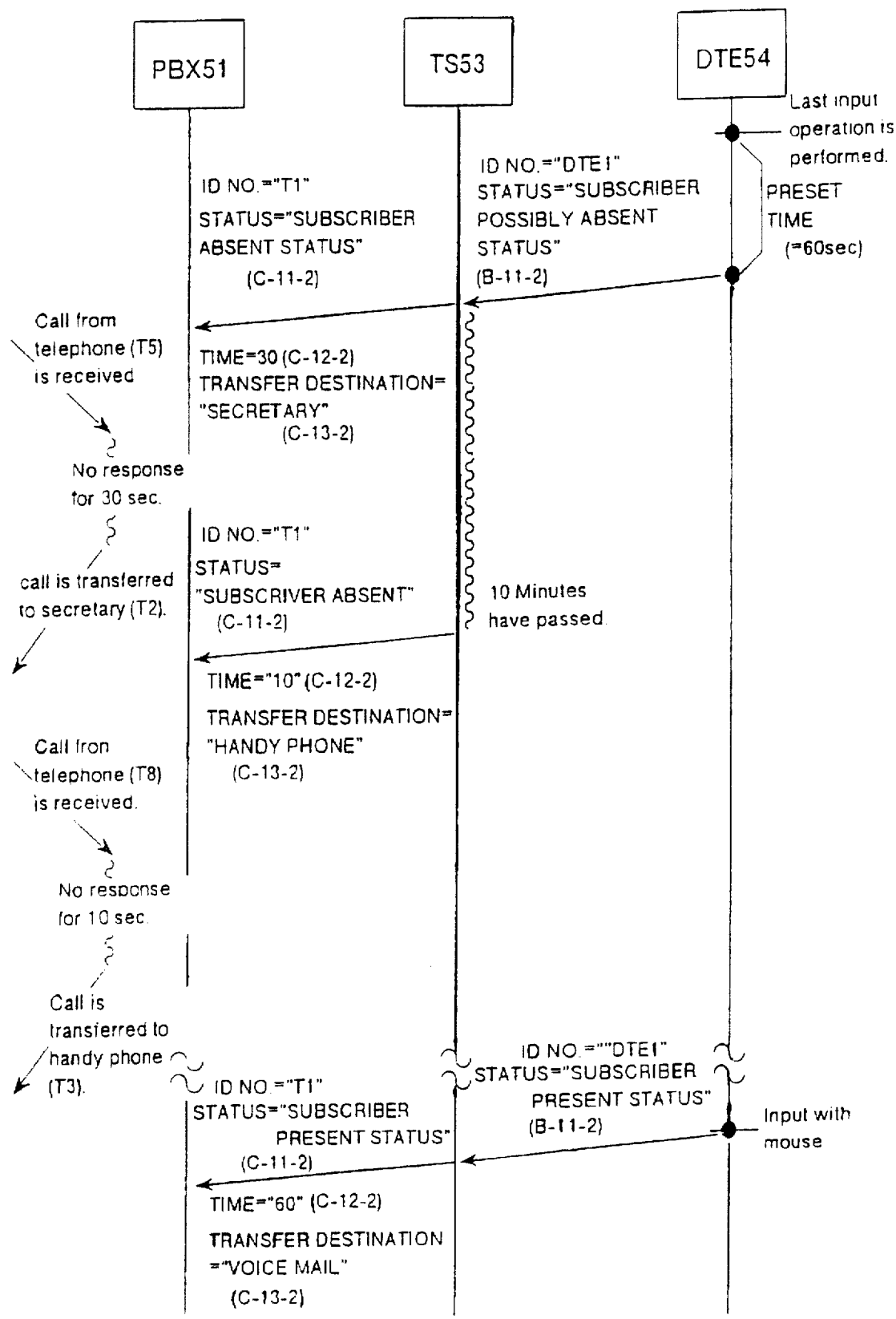
FIG. 11 is a diagram illustrating a call transfer process sequence in accordance with EMBODIMENT 1.

FIG. 11 is a diagram illustrating an information transmission procedure to be followed in a call transfer process in accordance with EMBODIMENT 1. Referring thereto, a call transfer process will be described in detail.

In a terminal DTE1, the I/O input monitoring program A-1 monitors an input operation performed by means of an input device such as keyboard 67 or mouse 68, and measures an elapsed time tm after the last input operation.

When the elapsed time tm after the last input operation exceeds a preset time, e.g., 60 seconds, the I/O input monitoring program A-1 judges that the terminal DTE1 is in the subscriber possibly absent status, and transmits to the TS 53 data of ID NO.="DTE1" and STATUS="SUBSCRIBER POSSIBLY ABSENT STATUS" which indicate that a subscriber of the terminal DTE1 is possibly absent.

Upon receiving the data, the terminal status management program B-1 writes data indicative of "SUBSCRIBER POSSIBLY ABSENT STATUS" in the data field B-11-2 of "STATUS" in the TS 53. Then, the elapsed time measuring program B-2 starts measuring the elapsed time which is to be written in the data field B-11-4 of "ELAPSED TIME" in the terminal/telephone status management data B-1, and writes "01" in the data field B-11-5 of "LAST REFERENCE RECORD".

Since the elapsed time in the data field B-11-4 is between 0 minute and 10 minutes where the time measurement is just started, the program B-2 refers to TIME1 (B-12-3) and TIME2 (B-12-4) in the response delay transfer condition data B-12 and determines that the preset time and transfer destination for response delay transfer are 30 seconds and "secretary", respectively.

The program B-2 thereafter transmits to the PBX 51 data of the ID number, status, time and transfer destination as shown in FIG. 11.

Upon receiving these data, the server information processing program C-1 in the PBX 51 writes the status, time and transfer destination in the data fields C-11-2, C-12-2 and C-13-2, respectively, of the data section 86 in the PBX 51, and writes the ID number in data fields C-11-1, C-12-2 and C-13-1 of the data section 86.

In the event that a response operation such as off-hook is not performed at the telephone T1 within 30 seconds (specified in the data field C-12-2) after a call is received by the telephone T1 for which the transfer time and destination are thus specified in the PBX 51, the call transfer program transfers the call to the telephone T2 of the secretary (specified in the data field C-13-2).

Even if the subscriber of the terminal DTE1 and telephone T1 forgets to make a subscriber absence registration at the telephone T1 when he steps out, this call transfer process allows the status of the telephone T1 to be automatically set to "SUBSCRIBER POSSIBLY ABSENT STATUS" for the call transfer control by detecting no input operation performed at the terminal DTE1. This provides a more convenient call transfer function to the users.

There will next be described a case where the elapsed time written in the data field B-11-4 of the data B-11 exceeds 10 minutes after the TS 53 receives the data indicative of the subscriber possibly absent status.

In this case, the elapsed Time measuring program B-2 changes the last reference record in the data field B-11-5 of the terminal/telephone status management data B-11 to "02" to refer to a record of RECORD NO.="02" in the response delay transfer condition data B-12. At the same time, the program B-2 transmits to the PBX 51 data of PRESET TIME="10 sec" (B-12-5) and TRANSFER DESTINATION NUMBER="HANDY PHONE" (B-12-6) registered in the record of RECORD NO.="02" (B-12-2), as shown in FIGS. 10 and 11.

Thus, the time and destination for the response delay transfer of a call in the PBX 51 can be changed in accordance with the length of the elapsed time after the last input operation is performed at the terminal DTE1. Therefore, the call transfer can be appropriately controlled in accordance with the elapsed time after the subscriber steps out.

There will next be described a case where an input operation is performed by a mouse at the terminal DTE1. In this case, the subscriber of the terminal DTE1 is considered to be present because the mouse is operated.

When detecting the input operation, the I/O input monitoring program A-1 transmits to the TS 53 data of ID NO.="DTE1" and STATUS="SUBSCRIBER PRESENT STATUS" (B-11-2) to notify the TS 53 that the subscriber of the telephone T1 is present.

In substantially the same manner as the aforesaid procedure, the terminal status management program B-1 in the TS 53 transmits to the PBX 51 data of ID NO.="T1", STATUS="SUBSCRIBER PRESENT STATUS", TIME= "60" and TRANSFER DESTINATION="VOICE MAIL".

In the TS 53, "SUBSCRIBER PRESENT STATUS" and "00" are written in the data fields B-11-2 and B-11-5, and the data of the preset time and transfer destination number registered in the data fields B-12-5 and B-12-6, respectively, of a record of RECORD NO.="00" are transmitted to the PBX 51 as a time and destination for response delay transfer.

In the event that a call is received by the telephone T1 within 10 minutes after the last input operation is performed at the terminal DTE1 and nobody responds to the call, the received call is transferred to the telephone T2 of the secretary after the calling operation continues for 30 seconds, as described in EMBODIMENT 1 shown in FIG. 11.

In the event that a call is received by the telephone T1 more than 10 minutes after the last input operation, the call is transferred to the handy phone T3 after the calling operation continues for 10 seconds.

Where a certain input operation is performed at the terminal DTE1, it is considered that the subscriber of the telephone T1 and terminal DTE1 returns to his seat, and the default setting of the response delay transfer condition data B-12 is selected.

According to this call transfer process, the subscriber can conveniently utilize the call transfer function of the telephone exchanging system without performing an intentional input operation for the subscriber presence/absence registration.

FIG. 12 is a diagram illustrating an exemplary format of a message to be transmitted between a terminal (DTE) 54 and the TS 53 as described in the transfer procedure shown in FIG. 11.

"MSG" is a message type which indicates whether the transmitted message is a subscriber presence management message or a subscriber absence management message. "SENDER" indicates whether the message originator is the terminal 54 or the TS 53. "SUBSCRIBER (ADDRESS)" indicates an identification of a subscriber of the terminal 54 and, for example, corresponds to a network address on the LAN. "STATUS" indicates a subscriber present/absent status, which is selected from three statuses, i.e., "SUBSCRIBER PRESENT STATUS", "SUBSCRIBER ABSENT STATUS" and "SUBSCRIBER POSSIBLY ABSENT STATUS". "MAIL TRANSFER" indicates whether the electronic mail transfer function is presently turned on or off. "MAIL TRANSFER DESTINATION" indicates an address of an electronic mail transfer destination. "DATE/TIME" indicates when the last input operation performed by means of an input device of the terminal 54 is detected.

FIG. 13 is a diagram illustrating an exemplary format of a message transmitted between the PBX 51 and the TS 53.

"MSG" indicates a message type, which is the same as that of the message shown in FIG. 12. "SENDER" indicates whether the message originator is the PBX 51 or the TS 53. "SUBSCRIBER (DN)" indicates an extension number of a telephone. "STATUS" indicates a subscriber present/absent status, which is selected from three statuses, i.e., "SUBSCRIBER PRESENT STATUS", "SUBSCRIBER POSSIBLY ABSENT STATUS" and "SUBSCRIBER ABSENT STATUS". "TIMING" indicates a time lag for response delay transfer. "RESPONSE DELAY TRANSFER DESTINATION" indicates a dial number (extension number or external phone number) of a transfer destination for response delay transfer. "REASON FOR ABSENCE" indicates a reason for subscriber absence which is registered at the telephone.

EMBODIMENT 2

A control method for an electronic mail transfer between computer terminals will be described in accordance with EMBODIMENT 2. In this electronic mail transfer control, the absent subscriber electronic mail transfer function of a terminal is turned off or reset when a certain operation is performed at a telephone corresponding to the terminal where the electronic mail transfer function is on.

Figure 14:
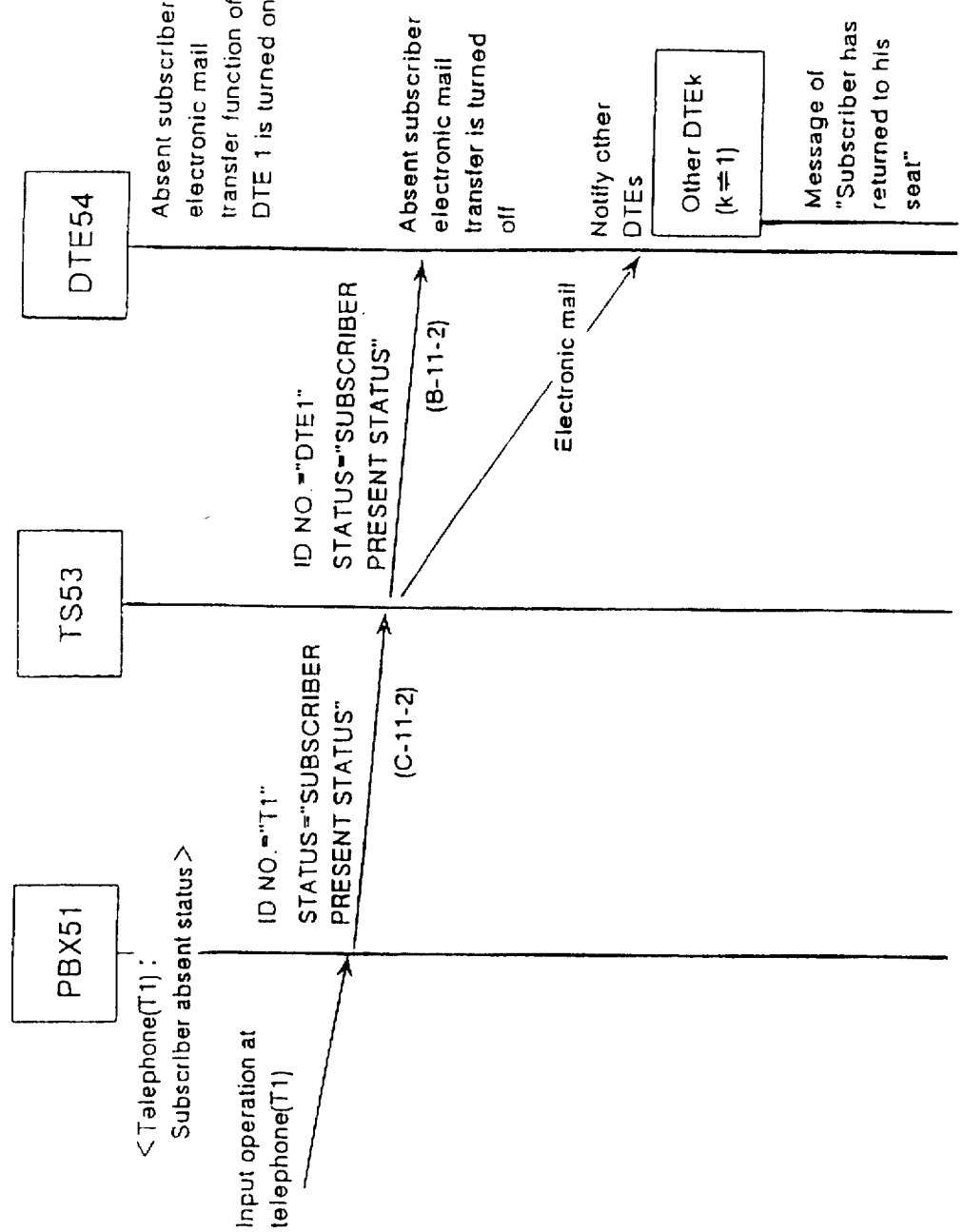
FIG. 14 is a diagram illustrating an information transmission process sequence in accordance with EMBODIMENTS 2 and 3.

FIG. 14 is a diagram illustrating an information transmission process according to EMBODIMENT 2.

It is herein assumed that the absent subscriber electronic mail transfer function of a terminal DTE1 is turned on, that is, the subscriber of the terminal DTE1 is presently absent. More specifically, in the transfer management data A11 for absent subscriber shown in FIG. 7, "ON" is set in the data field A-11-1, and an address of a transfer destination is written in the data field A-11-2. The subscriber absent status of a telephone T1 corresponding to the terminal DTE1 is registered in the PBX 51. That is, the "STATUS" in the data field C-11-2 is set to "SUBSCRIBER ABSENT STATUS".

When an input operation such as off-hook or dialing is performed (in this case, an off-hook operation is performed) at the telephone T1 owned by the subscriber of the terminal DTE1, the information transmission process is performed as follows.

When detecting the off-hook of the telephone T1, the telephone status monitoring program C-3 in the PBX 51 judges that the subscriber of the telephone T1 is present, and transmits information including data of STATUS= "SUBSCRIBER PRESENT STATUS" to the TS 53.

Upon receiving the information, the telephone status management program B-3 writes STATUS="SUBSCRIBER PRESENT STATUS" in the data field B-11-2 in the TS 53, and transmits information indicative of the subscriber presence to the terminal DTE1.

Upon receiving the information, the server information processing program A-3 is run to turn off the absent subscriber electronic mail transfer function in the terminal DTE1. More specifically, "OFF" is set in the data field A-11-1 in the transfer management data A-11 for absent subscriber.

In EMBODIMENT 2, the absent subscriber electronic mail transfer function is automatically turned off by an internal process of the terminal DTE1 as stated above, when a certain input operation is performed at the telephone T1 owned by the subscriber of the terminal DTE1 in a state where the absent subscriber electronic mail transfer function of the terminal DTE1 is on. Therefore, the subscriber of the terminal DTE1 does not have to intentionally perform a specific input operation for turning off the absent subscriber electronic mail transfer function when the subscriber returns to his seat.

Since the function is turned off by performing a simple input operation (off-hook, dialing or the like) at the tele-

19 phone T1, this electronic mail transfer control process alleviates the burdens to users of the absent subscriber electronic mail transfer function, and eliminates the possibility for the users to forget to make a subscriber presence/absence registration. Thus, the users can conveniently utilize the absent subscriber electronic mail transfer function.

EMBODIMENT 3

With reference to FIG. 14, an explanation will be given to an information transmission process for transmitting subscriber presence/absence information obtained from a telephone in the form of an electronic mail to a plurality of terminals hooked up to the LAN in accordance with EMBODIMENT 3.

Similarly to EMBODIMENT 2, when a certain input operation is performed at the telephone T1 in a state where the telephone T1 and terminal DTE1 are in the subscriber absent status, the telephone status monitoring program C-3 in the PBX 51 transmits to the TS 53 information indicating that the subscriber of the telephone T1 returns to his seat.

Upon receiving the information, the telephone status management program B-3 writes data of STATUS="SUBSCRIBER PRESENT STATUS" in the data field B-11-2 in the TS 53, and transmits the information of the subscriber present status to terminals other than the terminal DTE1.

The information of the subscriber present status is transmitted by the electronic mail transfer program (not shown in FIG. 5) stored in the program section 75 in the TS 53. A message of "The subscriber of the terminal DTE1 returns to his seat", for example, is sent to subscribers of the terminals DTEk other than the terminal DTE1 in the form of an electronic mail, as shown in a lower right portion of FIG. 14.

Since a message saying that one subscriber who has been absent returns to his seat is delivered to the other subscribers when the subscriber present status is detected by detecting an input operation performed at a telephone owned by the subscriber, there is no need for the subscriber to perform intentional input operations for indicating the subscriber present status of the terminal and for notifying the other subscribers that the subscriber has returned to his seat.

That is, the subscriber can notify the other subscribers that the subscriber has returned to his seat, not by performing a specific input operation for indicating the subscriber present status, but by performing a simple input operation at the telephone owned by the subscriber. Further, there is no need for the other subscribers to inquire whether the subscriber of the telephone has returned to his seat, thereby ensuring effective utilization of the LAN and telephone exchanging system to streamline the business.

In the information transmission process according to EMBODIMENT 3, the message saying that the subscriber has returned to his seat is delivered in the form of an electronic mail to the other terminal subscribers when the status of the terminal is changed from the subscriber absent status to the subscriber present status.

Alternatively, a message saying that the subscriber has stepped out is delivered in the form of an electronic mail to the other terminal subscribers when an input operation for the subscriber absence registration is performed at the telephone owned by the subscriber.

Thus, the subscriber present/absent status of a telephone can be readily notified to the other terminal subscribers when a specific input operation for the subscriber presence/absence registration is performed at the telephone. This eliminates unnecessary telephone contacts between the subscribers, thereby ensuring effective utilization of the telephone exchanging system.

EMBODIMENT 4

Figure 15:
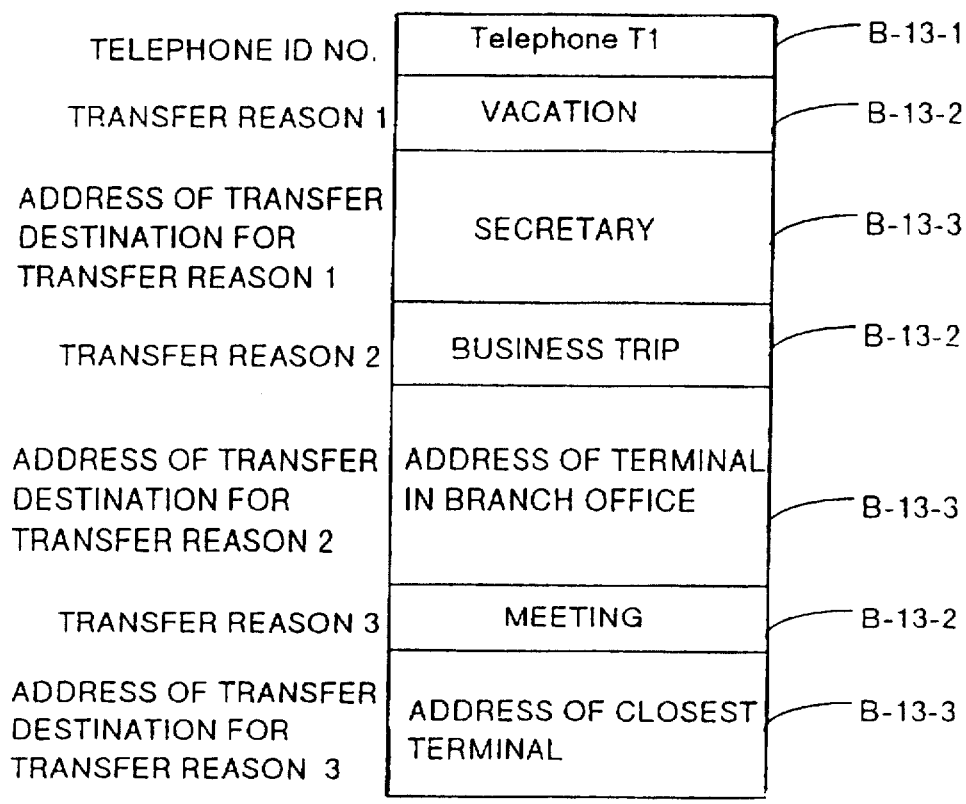
FIG. 15 is a diagram illustrating an example of first electronic mail transfer destination data B-13 to be stored in the data section 76 of the TS 53 in the present invention.

An explanation will be given to an information transmission process for changing the electronic mail transfer destination in accordance with the reason for subscriber absence which is preliminarily registered at the side of a telephone. It is herein assumed that reasons for subscriber absence can be registered at each telephone connected to the PBX 51. It is herein further assumed that reasons for electronic mail transfer and addresses of the electronic mail transfer destinations corresponding to the respective transfer reasons are preliminarily registered in the first electronic mail transfer destination data B-13 of the data section 76 in the TS 53 as shown in FIG. 15. For example, "SECRETARY" is registered as the electronic mail transfer destination for a subscriber absence reason of "VACATION". Similarly, an address of a computer terminal in a branch office and an address of the closest terminal are registered as transfer destinations for subscriber absence reasons of "BUSINESS TRIP" and "MEETING", respectively.

Figure 16:
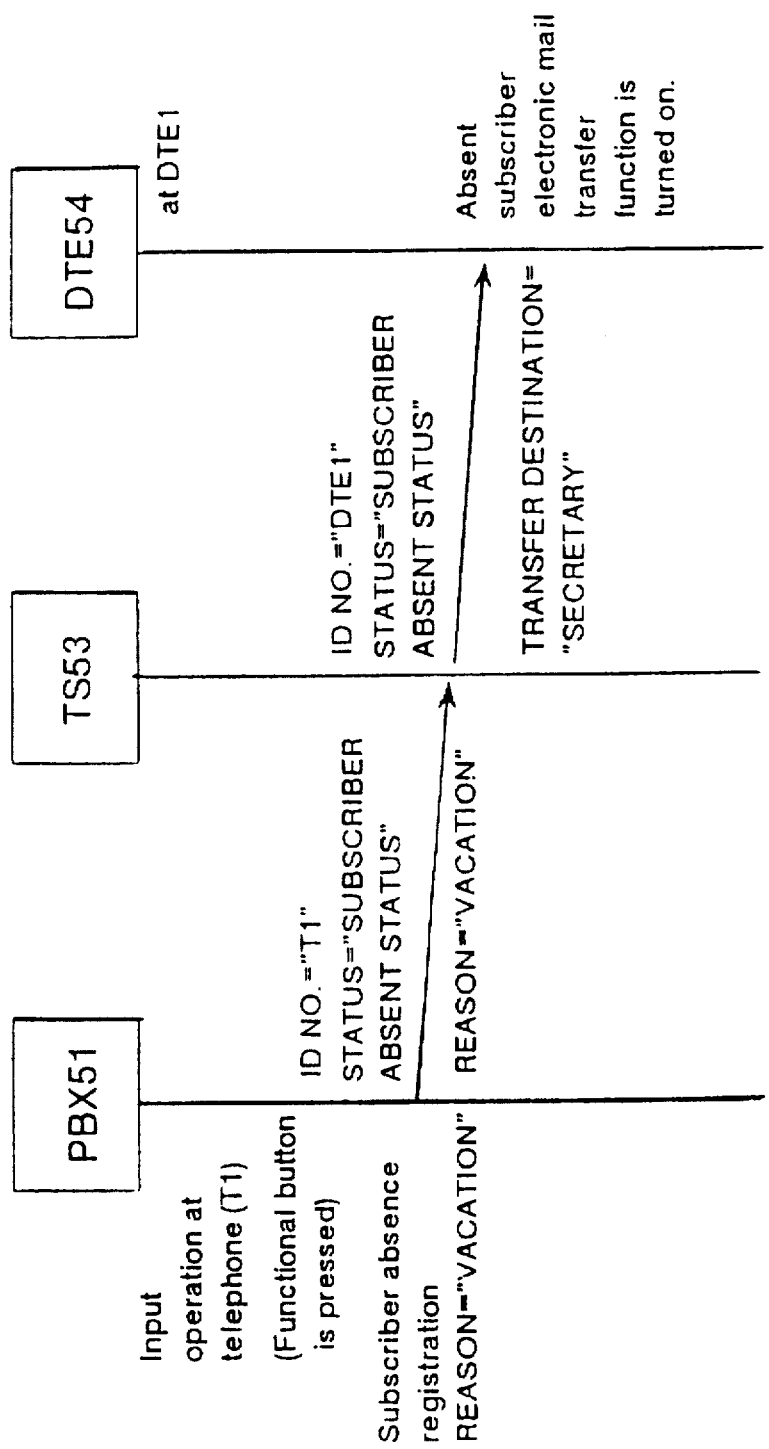
FIG. 16 is a diagram illustrating an information transmission process sequence in accordance with EMBODIMENT 4.

FIG. 16 is a diagram illustrating an information transmission process in accordance with EMBODIMENT 4.

It is assumed that a subscriber absence reason of "VACATION" is selected from the aforesaid subscriber absence reasons when an input operation is performed for the subscriber absence registration. At this time, the subscriber absent status processing program C-2 transmits to the TS 53 information of STATUS="SUBSCRIBER ABSENT STATUS" and SUBSCRIBER ABSENCE REASON="VACATION".

Upon receiving the information, the telephone status management program B-3 in the TS 53 retrieves data indicative of the subscriber absence reason of "VACATION" from the data field B-13-2 of TRANSFER REASON to extract from the data field B-13-3 an address of an electronic mail transfer destination, i.e., "SECRETARY", corresponding to the subscriber absence reason.

Further, the telephone status management program B-3 transmits to the terminal DTE1 data of STATUS="SUBSCRIBER ABSENT STATUS" (B-11-2) and TRANSFER DESTINATION="SECRETARY" (B-13-3) as shown in FIG. 16 to set "ON" and "SECRETARY" in the data fields A-11-1 and A-11-2, respectively, of the absent subscriber electronic mail transfer management data A-11. Thus, the absent subscriber electronic mail transfer function of the terminal DTE1 is turned on, and electronic mails thereafter destined for the terminal DTE1 is transferred to the terminal of the secretary.

FIG. 17 is a diagram illustrating an information transmission process to be performed where the absence reason is "NO REASON". It is herein assumed that the subscriber of the telephone T1 selects "NO REASON" as the absence reason or performs an input operation for the subscriber absence registration without selecting an absence reason.

At this time, the subscriber absent status processing program C-2 transmits to the TS 53 information of STATUS="SUBSCRIBER ABSENT STATUS" (C-11-2), ABSENCE REASON="NO REASON" and TRANSFER DESTINATION FOR ABSENT SUBSCRIBER="response delay transfer destination number" (C-13-2). In this case, for example, a phone number of the telephone T7 is set in the data field C-13-2.

Upon receiving the information, the telephone status management program B-3 in the TS 53 retrieves data indicative of the received transfer destination number (C-13-2), i.e., the number of the telephone T7, from the data field B-14-2 to extract an address of the electronic mail transfer destination corresponding to the telephone T7 from the data field B-14-3 of the second electronic mail transfer destination data B-14. It is herein assumed that the address of the terminal DTE7 is written in the data field B-14-3.

The telephone status management program B-3 transmits to the terminal DTE1 corresponding to the telephone T1 information of STATUS="SUBSCRIBER ABSENT STATUS" (B-11-2) and TRANSFER DESTINATION="DTE7" (B-13-3) as shown in FIG. 17.

Upon receiving the information, the server information processing program A-3 sets "ON" in the data field A-11-1 of the absent subscriber electronic mail transfer management data A-11 and sets "DTE7" corresponding to the telephone T7 in the data field A-11-2 in the terminal DTE1 to turn on the absent subscriber electronic mail transfer function.

Thus, electronic mails thereafter destined for the terminal DTE1 are all transferred to the terminal DTE7 corresponding to the telephone T7 which is specified as the response delay transfer destination at the side of the telephone T1 corresponding to the terminal DTE1.

Therefore, the absent subscriber electronic mail transfer function of a terminal can be turned on to specify a transfer destination only by performing an input operation for the subscriber absence registration at a telephone corresponding to the terminal.

Further, an electronic mail can be transferred to a preliminarily registered transfer destination corresponding to a subscriber absence reason which has been input at a telephone.

EMBODIMENT 5

An explanation will be given to an information transmission process for changing the status of a telephone to the subscriber present status when the power to a terminal corresponding to the telephone is turned on.

FIG. 18 is a diagram illustrating an information transmission process in accordance with EMBODIMENT 5. It is herein assumed that the power to the terminal DTE1 is turned on.

At this time, the power-on/off program A-2 of the terminal DTE1 is run to transmit to the TS 53 subscriber presence information of STATUS="SUBSCRIBER PRESENT STATUS" as shown in FIG. 18.

Upon receiving the information, the terminal status management program B-1 sets "SUBSCRIBER PRESENT STATUS" in the data field B-11-2 in the TS 53, and transmits to the PBX 51 subscriber presence information of ID NO.="T1" and STATUS="SUBSCRIBER PRESENT STATUS". Upon receiving the information, the server information processing program C-1 changes the status (C-11-2) of the telephone T1 corresponding to the terminal DTE1 from "SUBSCRIBER ABSENT STATUS" to "SUBSCRIBER PRESENT STATUS" in the PBX 51.

Thus, the status of a telephone can be readily set to the subscriber present status for the subscriber presence/absence registration function by turning on the power to a terminal corresponding to the telephone.

EMBODIMENT 6

An explanation will be given to an information transmission process for changing the status of a telephone to the subscriber absent status when the power to a terminal corresponding to the telephone is turned off.

FIG. 19 is a diagram illustrating an information transmission process in accordance with EMBODIMENT 6. It is herein assumed that the power to the terminal DTE1 is turned off.

At this time, the power-on/off program A-2 of the terminal DTE1 is run to transmit to the TS 53 subscriber absence information of STATUS="SUBSCRIBER ABSENT STATUS" as shown in FIG. 19.

Upon receiving the information, the terminal status management program B-1 sets "SUBSCRIBER ABSENT STATUS" in the data field B-11-2 in the TS 53, and transmits to the PBX 51 subscriber absence information of ID NO.="T1" and STATUS="SUBSCRIBER ABSENT STATUS".

Upon receiving the information, the server information processing program C-1 changes the status (C-11-2) of the telephone T1 corresponding to the terminal DTE1 from "SUBSCRIBER PRESENT SUTATUS" or "SUBSCRIBER POSSIBLY ABSENT STATUS" to "SUBSCRIBER ABSENT STATUS" in the PBX 51.

Thus, the status of a telephone can be readily set to the subscriber absent status for the subscriber presence/absence registration function by turning off the power to a terminal corresponding to the telephone.

By employing substantially the same procedure as in EMBODIMENT 6, the status of a telephone can be set to the subscriber absent status, i.e., the transfer function for absent subscriber can be turned on, in response to a termination operation of a session performed at a computer terminal.

In a client-server system on an LAN, login command or logout command is generally used to start or end a session for data communications.

When the logout command is input in a session at a terminal, it is expected that the subscriber of the terminal steps out after the session. Therefore, the transfer function of the telephone for absent subscriber can be turned on in response to the logout operation. Since the information transmission process for this transfer function turn-on process is substantially the same as shown in FIG. 19, an explanation therefor is dispensed with.

EMBODIMENT 7

An explanation will be given to an information transmission process for changing the status of a telephone to the subscriber absent status when the subscriber of the telephone does not respond to the telephone which is allowed to ring a predetermined time period after the last input operation is performed at a terminal corresponding to the telephone.

FIG. 20 is a diagram illustrating an information transmission process in accordance with EMBODIMENT 7.

In substantially the same manner as in EMBODIMENT 1 shown in FIG. 11, information of STATUS="SUBSCRIBER POSSIBLY ABSENT STATUS" (B-11-2) is transmitted to the TS 53 at a preset time period (=60 seconds) after the last input operation is performed at the terminal DTE1. Thereafter, information of TRANSFER DESTINATION="SECRETARY" is transmitted from the TS 53 to the PBX 51.

After the TS 53 receives the information of STATUS="SUBSCRIBER POSSIBLY ABSENT STATUS" (B-11-2), the elapsed time measuring program B-2 in the TS 53 starts measuring the elapsed time. After 15 minutes, the program B-2 transmits to the PBX 51 information for calling the telephone T1 for confirmation of the subscriber absent status. The information includes, for example, STATUS="SUBSCRIBER ABSENT STATUS".

Upon receiving the information, the server information processing program C-1 calls the telephone T1 corresponding to the terminal DTE1 via the network system (EXC) 83 and subscriber circuit 87 in the PBX 51 to allow the telephone T1 to ring (or to perform a ringing operation on the telephone T1).

Where no input operation is performed at the telephone T1 within a predetermined time, e.g., 50 seconds in response to the calling operation of the telephone T1 performed by the PBX 51, the program C-1 judges that the telephone is in the subscriber absent status, and turns on the absent subscriber call transfer function. In the TS 53, the status of the telephone T1 is set to "SUBSCRIBER POSSIBLY ABSENT STATUS", though not shown in FIG. 20. Therefore, the absent subscriber electronic mail transfer function of the terminal DTE1 is also turned on.

Where an input operation such as off-hook is performed at the Telephone T1 during the calling operation of the telephone T1 performed by the PBX 51, the process shown in FIG. 14 is executed, and the status of the telephone T1 is changed to the subscriber present status. Further, the information of the subscriber present status is transmitted to the TS 53 and the terminal DTE1, and the terminal DTE1 is returned to the subscriber present status.

Where an input operation is performed by means of an input device such as a mouse at the terminal DTE1 during the calling operation, the terminal DTE1 and telephone T1 are returned to the subscriber present status (not shown in FIG. 20). At this time, an information transmission process to be performed in the case that the mouse is used as shown in a lower portion of FIG. 11 is performed to transmit subscriber presence information to the PBX 51.

Thus, the calling operation is performed for confirmation of the subscriber absent status of a telephone when the telephone is in the subscriber possibly absent status. Accordingly, the subscriber present/absent status can be more accurately and rapidly confirmed. Hence, the subscriber present/absent status can be correctly managed in the PBX and the TS and in each terminal, based on an actual situation of the subscriber of the terminal.

In accordance with the present invention, the telephone exchanging system and the information processing system are linked with each other, so that the telephone exchanging system controls the call transfer based on information input from a terminal and the information processing system controls the electronic mail transfer based on information input from a telephone. Therefore, the subscriber presence/absence management function and the electronic mail/call transfer function can be readily actuated by an unintentional operation usually performed at the telephone or terminal. Thus, the workability of the subscriber presence/absence management function and the electronic mail/call transfer function can be significantly improved in an environment where a subscriber owns both a telephone and computer terminal.

In accordance with the present invention, the information processing system monitors an input operation performed at each terminal, and the telephone exchanging system controls the transfer of a call received by a telephone corresponding to the terminal based on information on the input operation performed at the terminal. Therefore, the subscriber presence/absence management function of the telephone exchanging system linked with the information processing system is controlled based on the information on the input operation at the terminal. Thus, the subscriber presence/absence management function and the call transfer function of the telephone exchanging system can be readily actuated by performing an ordinary input operation without performing an intentional operation for the subscriber presence/absence registration.

Further, the telephone exchanging system monitors an input operation performed at each telephone, and the information processing system controls the transfer of an electronic mail destined for a terminal corresponding to the telephone based on information on the input operation performed at the telephone. Therefore, the subscriber presence/absence management function of the information processing system linked with the telephone exchanging system is controlled based on the information on the input operation at the telephone. Thus, the subscriber presence/absence management function and the electronic mail transfer function of the information processing system can be readily actuated by performing an ordinary input operation without performing an intentional operation for the subscriber presence/absence registration.

In accordance with the present invention, the transfer destination of a call and the preset timing of response delay transfer at a telephone are determined on the basis of the length of an elapsed time after a subscriber possibly absent status occurs. Therefore, a call received by the telephone can be transferred to an appropriate transfer destination in accordance with the elapsed time without keeping a call originator waiting for a long time.

Further, suitable transfer conditions including the length of time elapse, transfer destination and preset timing for response delay transfer can be preliminarily registered by each subscriber.

In accordance with the present invention, the information processing system detects a power-on operation (which is considered to be one of input operations) of a terminal and transmits information on the power-on operation to the telephone exchanging system to control a call transfer function of the telephone exchanging system. Thus, a subscriber present status management can be easily performed to deactivate the call transfer function at the telephone exchanging system in response to the power-on operation performed at the terminal. Therefore, there is no need to perform intentional operations for changing the status of a telephone corresponding to the terminal to the subscriber present status and for preventing the call transfer.

Further, the information processing system detects a power-off operation (which is considered to be one of input operations) of a terminal and transmits information on the power-off operation to the telephone exchanging system to control a call transfer function of the telephone exchanging system. Thus, a subscriber absent status management can be easily performed to activate the call transfer function at the telephone exchanging system in response to the power-off operation performed at the terminal. Therefore, there is no need to perform intentional operations for changing the status of a telephone corresponding to the terminal to the subscriber absent status and for activating the call transfer function.

In accordance with the present invention, where the subscriber possibly absent status of a terminal is detected, a telephone corresponding to the terminal is allowed to ring for confirmation of the subscriber presence/absence. If the subscriber of the telephone and terminal responds to the telephone, it is confirmed that the subscriber is present.

On the other hand, if the subscriber does not respond to the telephone within a predetermined time period after the telephone starts ringing, it is confirmed that the subscriber is absent. Therefore, the call transfer and the electronic mail transfer can be controlled in accordance with the confirmed subscriber present/absent status.

In accordance with the present invention, when an input operation is performed at a telephone, it is judged that the subscriber is present at the telephone, and information on the subscriber present status of a terminal corresponding to the telephone is transmitted from the telephone exchanging system to the information processing system. Therefore, when the subscriber of the telephone returns to his seat in a state where the absent subscriber electronic mail transfer function of the terminal is on, a simple input operation performed at the telephone allows the status of the terminal to be changed to the subscriber present status in the information processing system to deactivate the absent subscriber electronic mail transfer function, and there is no need for the subscriber to perform an intentional input operation at the terminal.

Further, the telephone exchanging system transmits to the information processing system information indicating that the status of a telephone is changed to the subscriber present status or to the subscriber absent status. Therefore, the subscriber present/absent status of the telephone is notified to terminals other than a terminal corresponding to the telephone only by performing an operation for changing the status of the telephone to the subscriber present status or to the subscriber absent status without performing an input operation for the subscriber presence/absence registration at the terminal corresponding to the telephone.

In accordance with the present invention, reasons for subscriber absence at a telephone and addresses of electronic mail transfer destinations corresponding to the respective subscriber absence reasons are preliminarily stored in the information processing system. Therefore, the absent subscriber electronic mail transfer function of a terminal corresponding to the telephone can be turned on by making a subscriber absence registration and inputting a subscriber absence reason at the telephone to transfer an electronic mail to a suitable transfer destination corresponding to the subscriber absence reason.

What is claimed is:

1. An electronic mail transfer system comprising:

an information processing system accommodating a plurality of terminals and having an electronic mail transmitting function; and a telephone exchanging system accommodating a plurality of telephones preliminarily interrelated to the respective terminals and each having input means;

the telephone exchanging system monitoring an input operation performed by the input means of each of the telephones, and transmitting information indicative of the input operation to the information processing system;

the information processing system controlling an electronic mail transfer operation, based on the information indicative of the input operation transmitted from the telephone exchanging system, to transfer an electronic mail destined for a terminal to a predetermined transfer destination if no input operation is performed at a telephone corresponding to the terminal, and not to transfer the electronic mail if an input operation is performed at the telephone.

2. An electronic mail transfer system as set forth in claim 1, wherein, when an input operation is performed at a telephone in a state where an absent subscriber electronic mail transfer function of a terminal corresponding to the telephone is turned on in the information processing system, the telephone exchanging system transmits to the information processing system information indicating that the input operation is performed at the telephone and, upon receiving the information, the information processing system controls the terminal not to transfer the electronic mail destined for the terminal.

3. An electronic mail transfer system as set forth in claim 1, wherein the telephone exchanging system comprises a first subscriber presence/absence managing section for performing subscriber presence/absence management in the telephone exchanging system;

wherein the information processing system comprises:

a second subscriber presence/absence managing section for performing subscriber presence/absence management in the information processing system;

an electronic mail processing section for controlling a transfer operation of an electronic mail to be transferred between the terminals;

a status managing section for managing the statuses of the telephones and the terminals based on subscriber presence/absence information obtained from the first and second subscriber presence/absence managing sections; and an information storage section for storing therein the subscriber presence/absence information and transfer conditions.

4. An electronic mail transfer system as set forth in claim 3, wherein the information storage section preliminarily stores therein information on a telephone and data pairs of reasons of subscriber absence at the telephone and addresses of electronic mail transfer destinations, and, when a subscriber absent status is registered from the telephone along with a reason of the subscriber absence, the first subscriber presence/absence managing section transmits to the status managing section information on the subscriber absence registration including the reason of the subscriber absence, then the status managing section retrieves an address of an electronic mail transfer destination corresponding to the reason of the subscriber absence from the information storage section, and the second subscriber presence/absence managing section transmits information on the address of the transfer destination and the subscriber absence registration to a terminal corresponding to the telephone.

* * * * *